United States Patent [19]

Nakamura

[11] Patent Number: 4,999,663
[45] Date of Patent: Mar. 12, 1991

[54] FLASH DEVICE

[75] Inventor: Hiroaki Nakamura, Hachioji, Japan

[73] Assignee: Olympus Optical Co., Ltd., Japan

[21] Appl. No.: 446,400

[22] Filed: Dec. 5, 1989

[30] Foreign Application Priority Data

Dec. 9, 1988 [JP] Japan .................................. 63-311619
Jan. 31, 1989 [JP] Japan .................................... 1-22115

[51] Int. Cl.⁵ .............................................. G03B 7/00
[52] U.S. Cl. .................................. 354/415; 354/145.1
[58] Field of Search ......................... 354/132, 413–424, 354/149.1, 149.11, 145.1, 137

[56] References Cited

FOREIGN PATENT DOCUMENTS 51-32634 3/1976 Japan .

Primary Examiner—Richard A. Wintercorn
Assistant Examiner—David M. Gray
Attorney, Agent, or Firm—Louis Weinstein

[57] ABSTRACT

A flash device comprises a pre-flash circuit which conducts a small flash a plurality of times for reducing the pupil size in response to a camera release signal just before the commencement of the shutter opening operation and a main flash circuit for conducting flash for taking a picture after the commencement of shutter opening operation.

45 Claims, 31 Drawing Sheets (MODE SW2 Ro)

(MODE SW2 No)

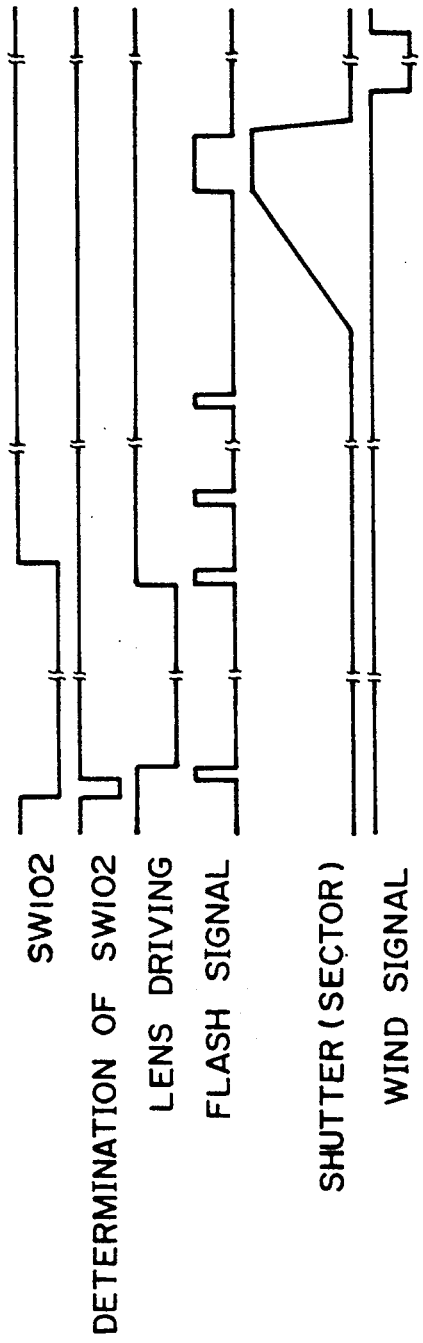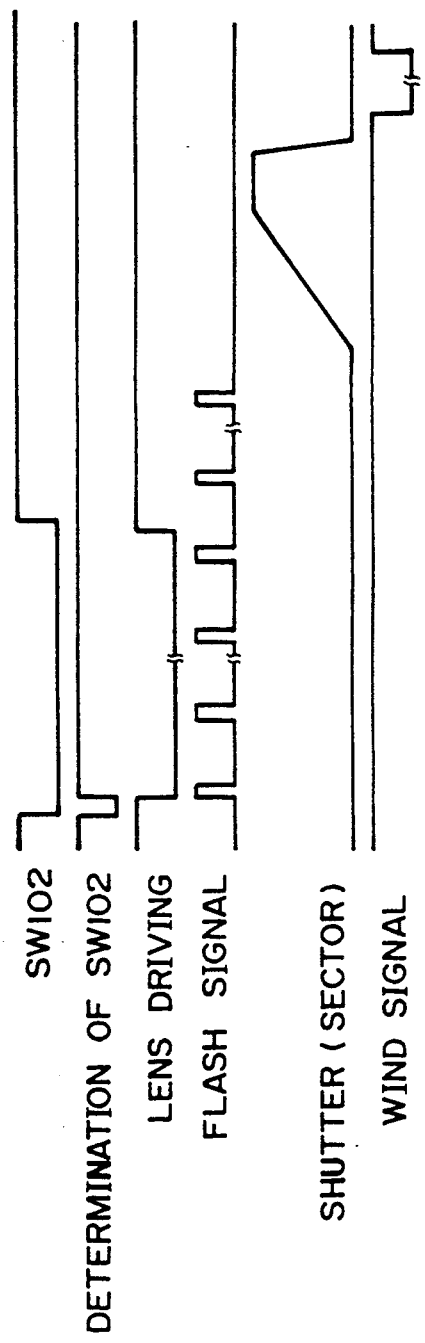

FLASH DEVICE

FIELD OF THE INVENTION

The present invention relates to a flash device, and in particular to a flash device having a capability of preventing red-eye phenomenon.

PRIOR ART

It is well known that red-eye phenomenon can occur when the eye of an object such as human being or animal is photographed wherein glowing red occurs when flash synchronized picture taking is conducted under a condition that the distance between the optical path of a taking lens and the center of a flash discharge tube is small.

Therefore various approaches for preventing this red-eye phenomenon from occuring have heretofore been proposed. One of the typical approaches is that an extra illumination lamp which is provided independently of a flash discharge tube is lit for a given period of time for reducing the pupil of eyes of an object prior to flash synchronized picture taking and then the flash discharge tube is fired in synchronization with shutter actuation is disclosed in Japanese Patent Publication No. Sho 58-48088.

Another approach is known in which the distance between the optical axis of a taking lens and a flash discharge tube is increased so that the following formula will be satisfied as is disclosed in Japanese Patent Publication No. Sho 58-20021.

$$3.6 < GNo < \frac{1}{0.37 - 0.73 \left( \frac{\tan^{-1} \frac{d}{400}}{2.5°} \right)}$$

It is considered that red-eye phenomenon is due to a fact that the red-color of the capillary vessel at the eyegrounds is photographed since the pupil of eyes opens widely at a dark place where flash is needed. Therefore, red-eye prevention means disclosed in the Japanese Patent Publication Sho 58-48088 turns on a lamp for a given period of time for reducing the pupil size just before flash synchronized picture taking. However the photographic apparatus becomes large since the lamp is provided independently of the flash discharge tube and is caused to be turned on. Since the period of time of the illumination is as long as 1.3 seconds, the apparatus has a disadvantage that the interval from the depression of a release button to starting of picture taking is long.

The red-eye prevention means disclosed in Japanese Patent Publication No. Sho 58-20021 has problems due to the fact that the photographic apparatus become cumbersome since the distance between the optical axis of the taking lens and the flash discharge tube should be larger with the increase in GNo (guide number) of the flash discharge tube and the increase in the focal length of the lens.

It generally takes 0.2 to 0.5 seconds (as response lag time) for the pupil of eye to reduce it's diameter in response to the light incident upon the eye. It takes about not less than one second to complete the response, that is, to reduce to a pupil diameter previously responded. Brightness not less than 1000 ftcd is necessary to reduce pupil diameter to a minimum diameter. Efficiency is very low if a continuous illumination is used. This is due to a fact that the pupil at first rapidly reduces its diameter at a moment of incidence of light and then the pupil diameter gradually settles to a size corresponding to the brightness of the incident light. Light reflex does not depend upon the absolute value of the strength of the incident light and is caused by change in light.

More specifically, the pupil traces a diameter reduction process as shown by a curve $\alpha$ in FIG. 36 when the diameter of the pupil of a human being changes a diameter $\phi A$ to $\phi B$ on exposure to continuous light having a strength L. Considering stimulation of light to a brain through the optic nerve of human the being, there is a phenomenon that the brain receives change in light as a stimulus and largely responds thereto, but its response to light gradually becomes slow if the light is continuous light. This phenomenon is illustrated in FIG. 37. The pupil of a human being settles to have a given diameter $\phi A$ at a brightness $L_A$ in an equilibrium between an instruction output Fo from the brain acting to close the pupil and an output acting to suppress the force acting to close of the pupil as shown in FIG. 37. When the brightness changes from $L_A$ to a higher brightness $L_B$, the brain strongly responds to this change and provides a larger output Fc. However the response of the brain to light rapidly becomes slow thereafter and the output Fc rapidly becomes low. That is, the pupil will quickly contract the moment that the light changes and the pupil slowly contracts thereafter.

Accordingly continuous illumination of a lamp for reducing the pupil diameter before flash synchronized picture taking as is disclosed in Japanese Patent Publication No. Sho 58-48088 is low in efficiency and its effects are different depending on ambient light.

An approach in which high brightness pre-flash is conducted once to reduce the pupil size before flash picture taking has been proposed. Although this approach is not influenced by the ambient light since brightness of the flash is high, emission of light not less than GNo 10 is required to conduct effective pre-flash. It takes not less than one second for the pupil to exhibit a maximum response. This approach is not excellent in efficiency.

In the afore-mentioned prior art, a lamp for reducing pupil diameter is lit for a given period of time when a release button is half depressed (this depression is hereafter referred to as first depression) and opening operation of a shutter and flash for picture taking is conducted when the release button is fully depressed to a final region. (This depression is hereafter referred to as second depression.)

An interval of time from the first to second depression varies with users and picture taking conditions. An interval of time from completion of preillumination to the commencement of picture taking is not constant, resulting in that prevention of red-eye phenomenon is unstable.

SUMMARY OF THE INVENTION

It is a first object of the present invention to provide a compact flash device having less time lag, which can prevent red-eye phenomenon by conducting pre-flash a plurality of times for reducing pupil size prior to flash for taking picture.

It is a second object of the present invention to provide a flash device in which a red-eye preventive flash mode and normal flash mode can be switched.

It is a third object of the present invention to provide a flash device which can stably prevent red-eye phenomenon by keeping constant the interval from the completion of pre-flash to the commencement of picture taking.

It is a fourth object of the present invention to provide a camera system having a built-in CPU in which operation of the CPU is stabilized by prohibiting flash during the operation of the CPU.

It is a fifth object of the flash device to provide a flash device in which miniaturization of a main capacitor for the flash device and shortening of charging time can be accomplished by activating a Dc/Dc converter in response to the commencement of pre-flash for contracting the pupil.

It is a sixth object of the present invention to provide a flash device which is capable of, in advance, alarming a user that red-eye may occur when normal flash picture taking is conducted.

The basic principle of a flash device of the present invention is illustrated in FIG. 1(A). Pre-flash $P_A$ having a high brightness equivalent to GNo of 0.6 to 2 is conducted a plurality of times for contracting the pupil in response to a camera release signal just before the opening of a shutter and then synchronized flash Pc for exposure is conducted after the commencement of opening of the shutter. As is well known, the term G No represents the light output of an electrical flash at a given distance and f-number when an ISO 100-speed film is used. More specifically, G No = D × f, where D = distance of the subject, f = f-number.

Conducting such pre-flash $P_A$ can shorten the response completion time of the pupil to 0.5 to 1.0 second from 1.3 to 1.6 seconds which was conventionally taken by continuous pre-illumination $P_B$ shown in FIG. 1(B).

This is due to the following reasons. If light having a strength $L_A$ is projected at intervals of a given period of time, the optical nerve is subject to new stimulus each time the light is incident. The brain repeatedly strongly outputs a force acting to close the pupil. The pupil rapidly contracts to a given pupil diameter $\phi B$ as shown by a curve $\beta$ in FIG. 36. This contraction process is different from that on exposure to continuous light. Since the brain is subject to new stimulus before perception of the brain to the light will slow, the brain constantly feels the force to be strong. As a result, a high force Fc acting to close the pupil is outputted as shown in FIG. 38 so that the pupil is rapidly reduced to a diameter corresponding to the afore-mentioned brightness $L_B$.

Results of an experiment which was conducted upon a number of persons are shown in FIG. 2. It is apparent from the FIG. 2 that a period of time until the completion of the response which reduces the pupil diameter to a small size is approximately 0.7 second when the interval of flash including small pulsated light having a brightness of GNo of about 1 is 50 ms. If the interval of flash is 20 ms to 100 ms, the response time can be suppressed to about not longer than 0.9 sec. The energy used for pre-flash can be remarkably saved.

BRIEF DESCRIPTION OF THE FIGURES

FIGS. 28 and 29 are time charts showing the signal relation in the sixth embodiment;

DETAILED DESCRIPTION OF THE PREFERRED EMBODIMENTS

The present invention will be described by way of embodiments with reference to the drawings.

Figure 1:
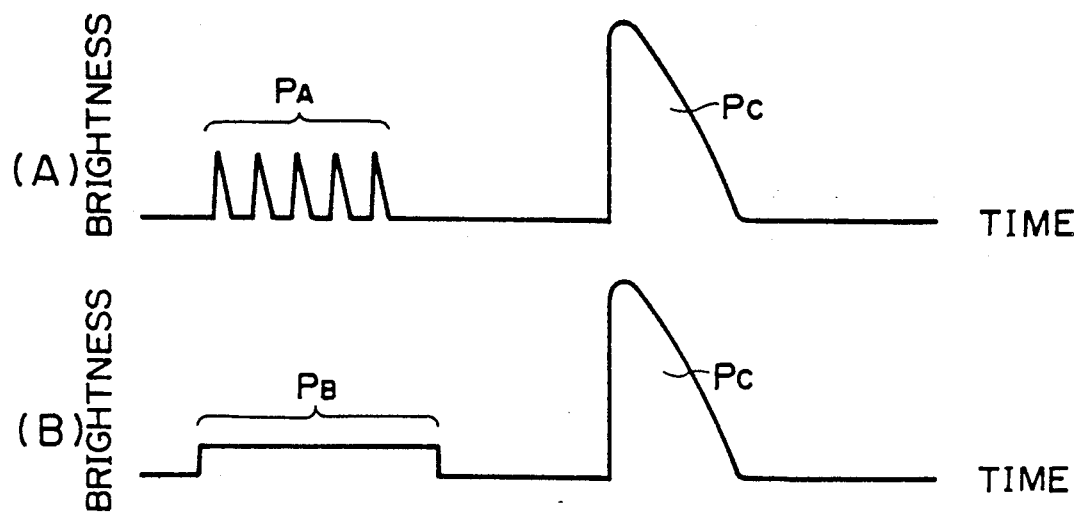
FIGS. 1(A) and 1(B) are graphs showing a flash for reducing the pupil size for illustration of the principle of the present invention.
Figure 2:
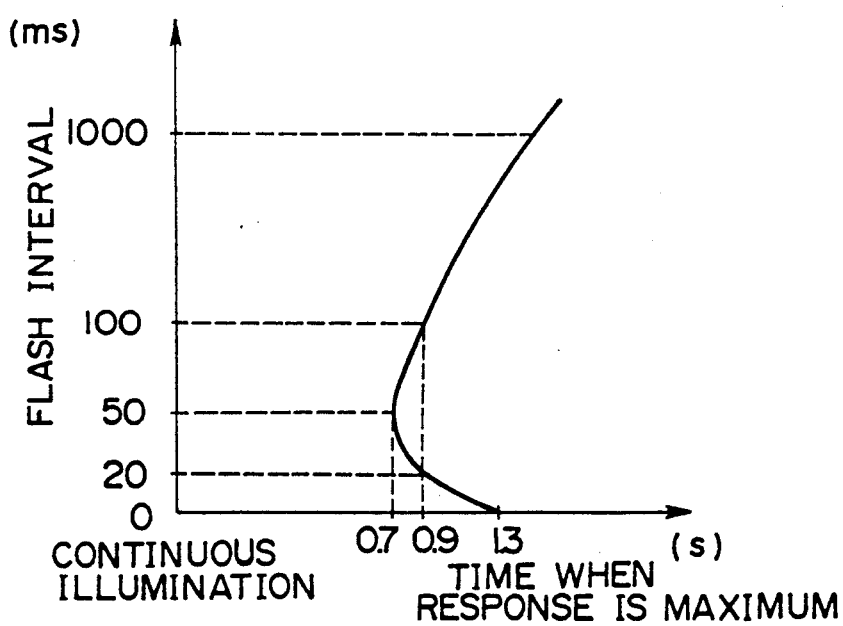
FIG. 2 is a graph showing the relation between the flash interval and the response of the pupil.
Figure 3:
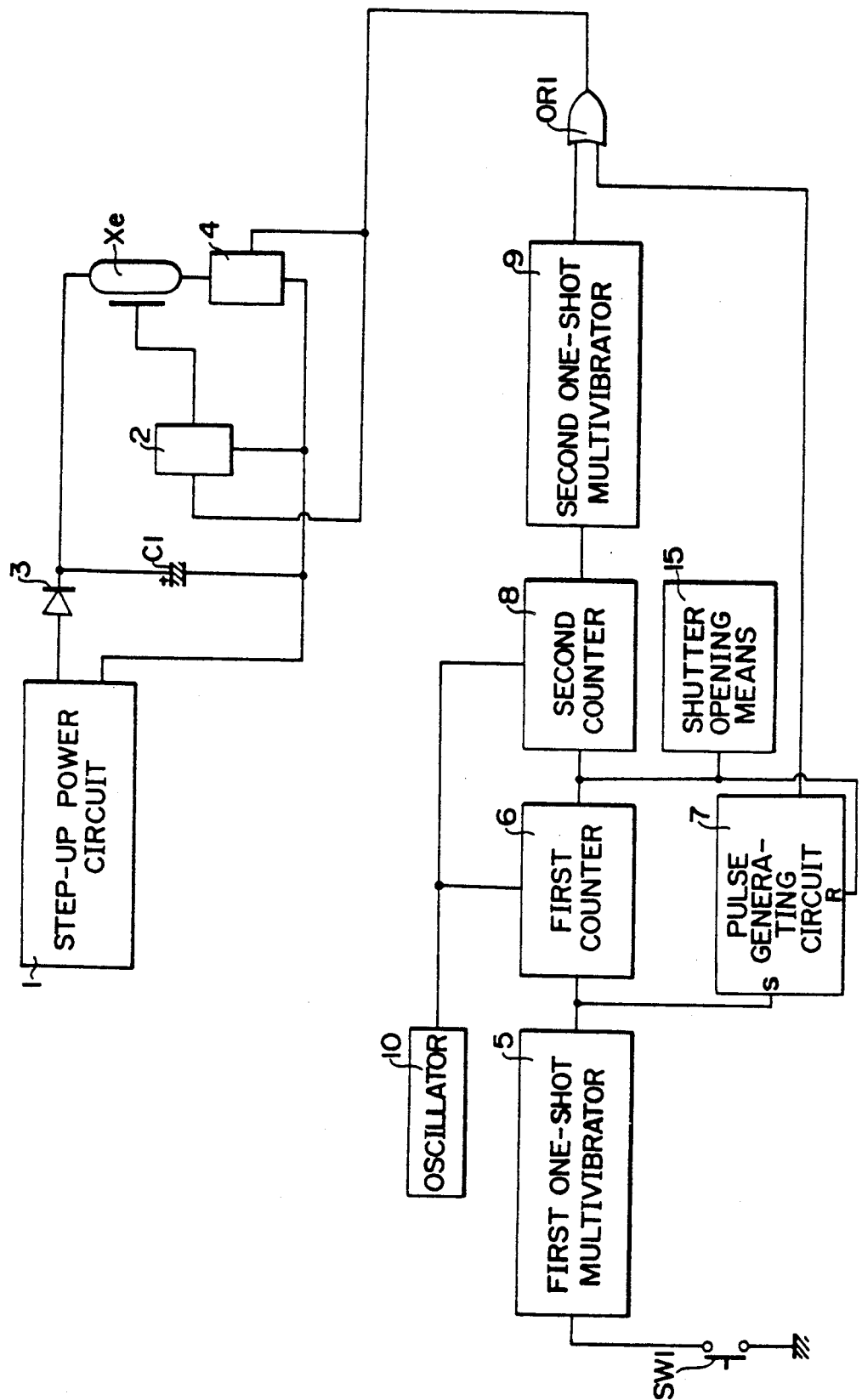
FIG. 3 is a block diagram showing a first embodiment of the flash device of the present invention.
Figure 4:
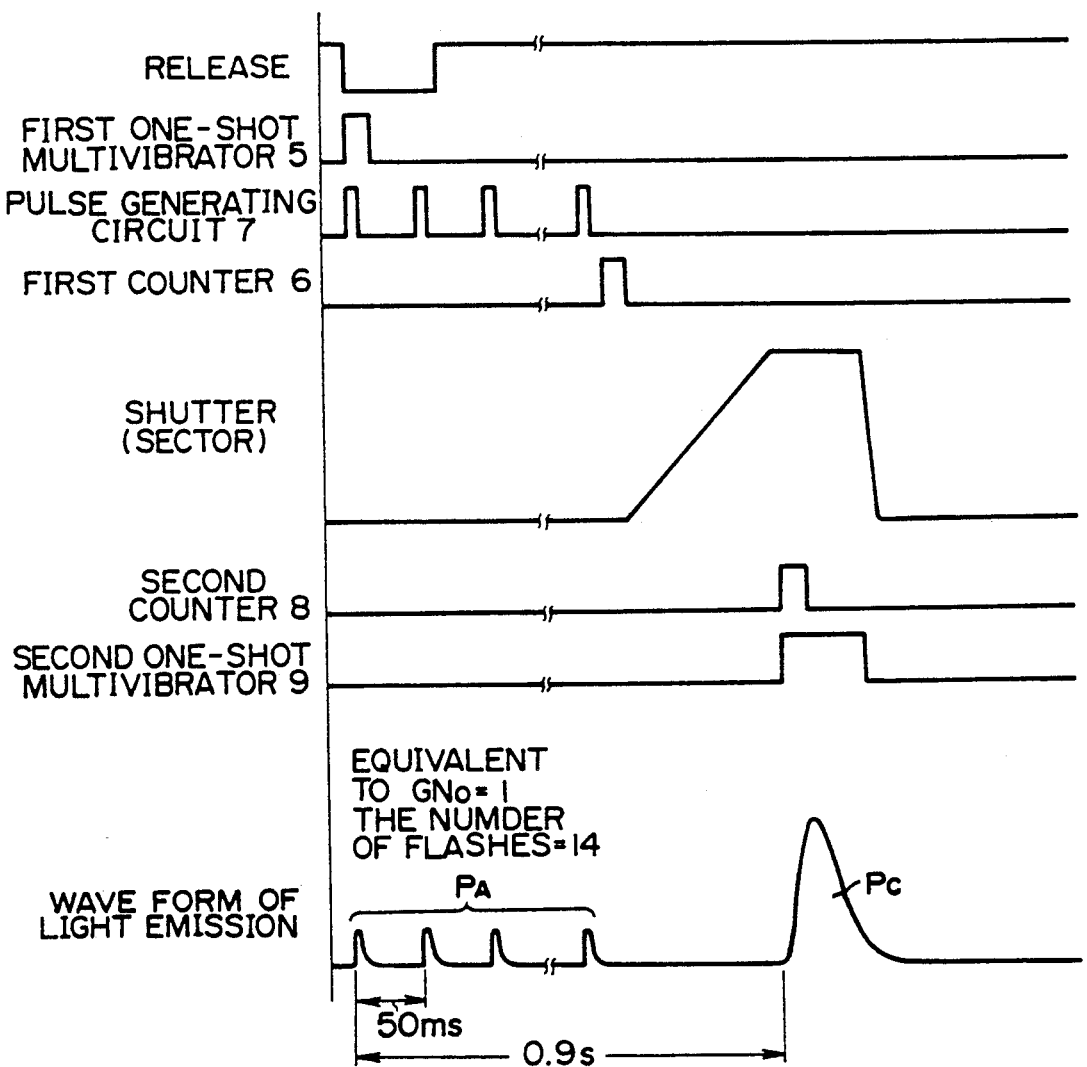
FIG. 4 is a time chart showing the relation of the signals in the flash device of the present invention.
Figure 5:
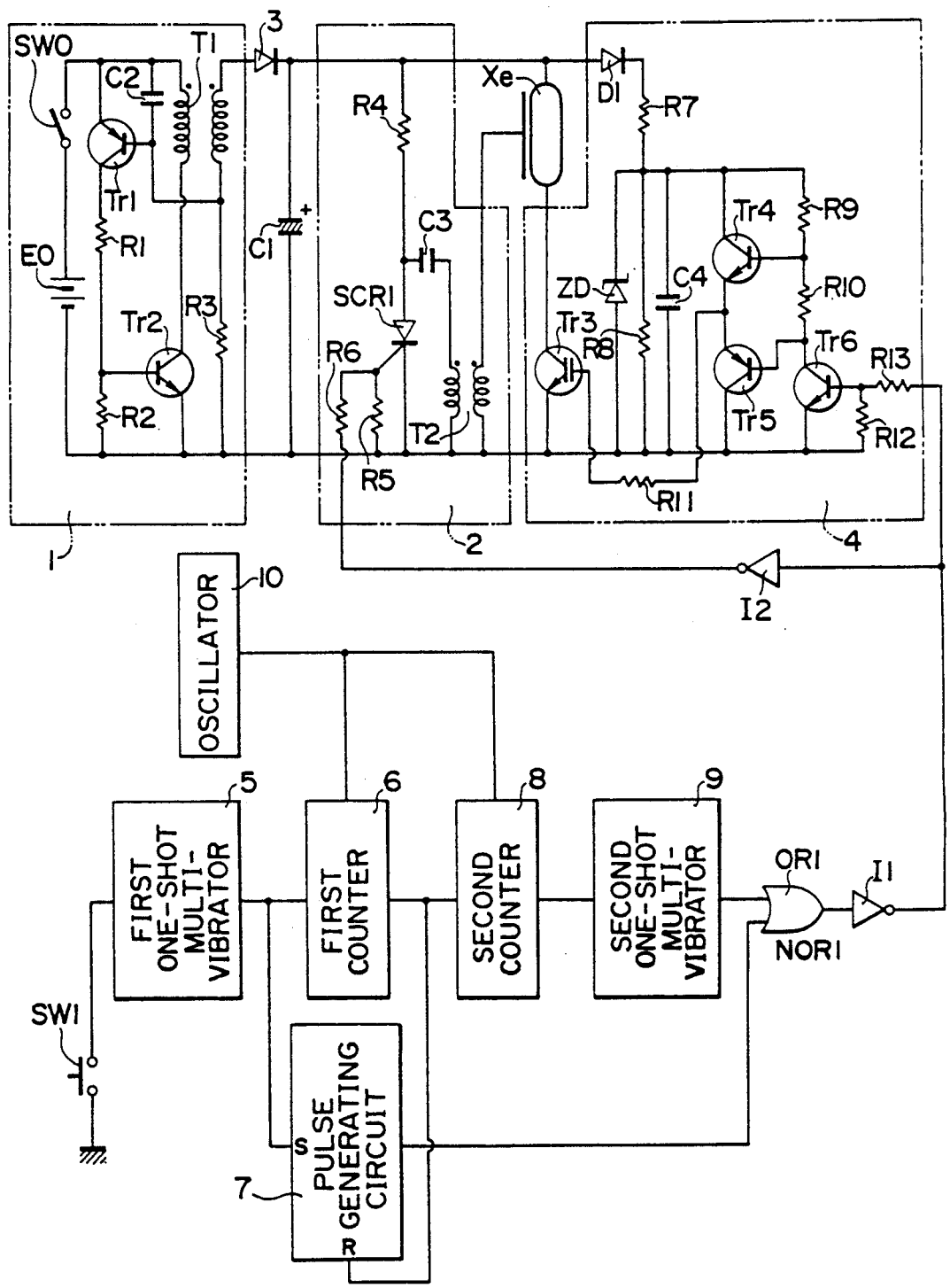
FIG. 5 is a diagram showing the details of the circuitry in the first embodiment of the flash device.

Referring now to FIGS. 3 through 5, there is shown a first embodiment of an electronic flash device of the present invention. The electronic flash device mainly comprises a flash light emitting circuit and a driving circuit as shown in FIG. 3. The flash light emitting circuit comprises a voltage step-up power circuit 1, a main capacitor C1, connected to the output of the power circuit 1 through a rectifying circuit 3, a flash discharge tube Xe, a light emitting control circuit 4 and a trigger circuit 2 of the discharge tube Xe. The driving circuit comprises a release switch Sw1, which is closed by a release operation, a first one-shot multivibrator circuit 5 into which a signal is inputted from the switch SW1, a first counter 6 and a pulse generating circuit 7 into which an output is inputted from the one shot multivibrator circuit, a second counter 8 into which an output from the first counter 6 is inputted, a second one shot multivibrator circuit 9 into which an output is inputted from the counter 8, an OR gate OR1 which receives the outputs from the multivibrator circuit 9 and the pulse generating circuit 7 for applying a driving signal to the trigger circuit 2 and the light emitting control circuit 4 and an oscillator 10 for driving the first and second counters 6 and 8.

The voltage step-up power source circuit 1, the trigger circuit 2 and the light emitting control circuit 4 are formed as shown in FIG. 5 in detail. The voltage step-up power circuit, comprises a series circuit of a transistor Tr1, resisters R1 and R2, a series circuit of a primary winding of the step-up transformer T1, and a transistor Tr2, a series circuit of a capacitor C2 and a resister R3 and a secondary winding of the voltage step-up transformer, which are connected as shown.

In the thus formed step-up power circuit 1, when the power switch SWO is turned on, a base current flows to the transistor Tr1 through the resistor R3 so that a collector current flows through the transistor Tr1. This collector current will become a base current of transistor Tr2 so that a collector current flows through the transistor Tr2. Then a current flows through the primary winding of the step-up transformer Ti so that cross magnetic flux from the primary winding to secondary winding induces a high voltage at the secondary winding. This causes a charging current to the main capacitor C1, via a rectifying diode 3 from the output terminal of the transformer T1. Since the charging current flows through the base electrode of the transistor Tr1, a collector current flows through the transistor Tr1. Accordingly, the base current of the transistor Tr2 increases. The increase in the base current increases the collector current and the charging current to the main capacitor C1, this positive feedback effect causes the transistor Tr2 to be saturated. No change in the current through the primary winding causes no change in magnetic flux through the secondary winding. Therefore energy is formed in the secondary winding in such a direction to reversely bias a diode 3. The transistor Tr1 is reversely biased so that it is turned off and the transistor Tr2 is turned off (one cycle is completed). At this time, oscillation occurs at the secondary winding. In the half cycle where the transistor Tr1 is forwardly biased, the transistor Tr1 is turned on again to return to the initial state. The transistor Tr1 commences the next single cycle of the operation.

Oscillation operation is conducted in such a manner to charge the main capacitor C1.

The trigger circuit 2 comprises a series circuit of a resistor R4 and a thyristor SCR1, a trigger capacitor C3 and a trigger transformer T2 and resistors R5 and R6. The trigger capacitor C3 is precharged together with charging of the main capacitor C1. The SCR1 is rendered conductive when a signal is inputted to the gate of the SCR1 via the resistor R6. The charge in the trigger capacitor C3 is supplied to the primary winding of the trigger transformer T2 via the SCR1. Then a high voltage is generated in the secondary winding of the trigger transformer T2. This voltage is applied to a trigger electrode to trigger the flash discharge tube Xe.

The light emitting control circuit 4 comprises a transistor Tr3 which is commonly referred to as "IGBT" (Insulated Gate Bipolar Transistor) and is connected in series with the flash discharge tube Xe; a series circuit of a diode D1, resistors R7 and R8; a constant voltage diode ZD; transistors Tr4 to Tr6, and resistors R9 to R13 and the capacitor C4. The resistor R7, the constant voltage diode ZD and the capacitor C4 form a power source for driving the transistor Tr3.

The OR circuit OR1 in fact forms a NOT circuit NOR1 together with an inverter I1. A signal is applied to the base electrode of the transistor Tr6 through the NOR circuit. A signal is applied to the trigger circuit 2 via the inverter I2.

The output from the circuit NOR1 is normally at "H" level. The transistor Tr6 is turned on, the transistor Tr4 is turned off and the transistor Tr5 is turned on. The gate of the transistor Tr3 is at 0 volts so that the transistor Tr3 may not be turned on. When the output from the second one shot multivibrator circuit 9 or the pulse generating circuit 7 turns the transistor Tr6 off via the circuit NOR1, the transistor Tr4 is brought into the conductive state and a voltage is applied to the gate of the transistor Tr3 so that the transistor Tr3 is rendered conductive. In this case, the gate of the transistor Tr3 is biased for a period of time equal to the pulse width of the output from the second multivibrator 9 or the pulse generating circuit 7. That is, the flash discharge tube Xe flashes for a period of time equal to the pulse width. By connecting a capacitor in parallel with the resistor R11, the rise time of the bias to the gate of the transistor Tr3 may be made faster and the gate of the transistor Tr3 may be reversely biased when the transistor Tr5 is turned on.

The operation of the first embodiment of the thus formed flash device will be described with reference to the time chart shown in FIG. 4. When the release switch Sw1 is closed to generate a signal, the signal is applied to the first one-shot multivibrator circuit 5. The output from the circuit 5 is applied to the first counter 6 and the set terminal S of the pulse generating circuit 7 to drive them. The first counter circuit 6 is a time constant circuit for counting time from the release to the shutter start. The pulse circuit provides pulses to the OR circuit OR1 at an interval of a predetermined period of time.

The pulse generating circuit 7 operates in synchronization with the release operation in such a manner. Both circuits 2, 4 are driven when the pulse from the pulse generating circuit 7 is applied to the light emitting circuit 4 via the OR circuit OR1 and the inverter I1 and to the trigger circuit 2 via the inverter I2. Therefore pre-flash at a high brightness is conducted a plurality of times at intervals of a predetermined period of time. This pre-flash reduces the pupil size to prevent a red-eye phenomenon from occurring.

On the other hand, the output of the first counter 6 is applied to the second counter 8 and the reset terminal R of the pulse generating circuit 7. The shutter commences the operation simultaneously with the activation of the second counter 8 via shutter opening means 15. Since the pulse generating circuit 7 is reset, output of the pulse is stopped. The second counter 8 counts the time from the beginning of the shutter opening to the full opening. After completion of the counting, the counter 8 generates an output to the second one-shot multivibrator 9. A flash signal is inputted to the light emitting circuit 4 via the OR circuit OR1 from the one-shot multivibrator circuit 9 and is inputted to the trigger circuit 2 via the inverter I2. Therefore, main flash for flash photography is conducted in synchronization with the shutter operation. In the present embodiment, the pupil size was reduced to such a size that red-eye phenomenon will not occur under a condition that pre-flash PA having a light amount of GNO of 1 was conducted 14 times at intervals of 50 ms as shown in the time chart of FIG. 4. As a result a time lag to shutter release was 0.9 second. Various combinations of flash conditions such as a GNO of 0.6 to 2, flash times of 5 to 20, and a flash interval of 20 to 100 ms make it possible to reduce the pupil diameter of most persons to such a size that red-eye phenomenon will not occur with a time lag not lower than 1 second.

The first embodiment has been described by way of an electronic flash device which is built-in to a camera. However it is apparent that an electronic flash device which is separated from the camera body may be used and the release switch Sw1 may be replaced with a release synchronization signal 1 which is outputted from the camera body to be inputted to the first one-shot multivibrator circuit 5 and the shutter opening operation may be commenced in response to the output from the first counter and a turn-on signal from a conventional X contact may be applied to a second one-shot multivibrator circuit 9 in lieu of counting a period of time from the shutter opening operation to the full opening of the shutter by means of the second counter 8. The pre-flash may be replaced with intermittent light emission of WLED. This applies to the second and third embodiments which will be described hereafter.

Figure 7:
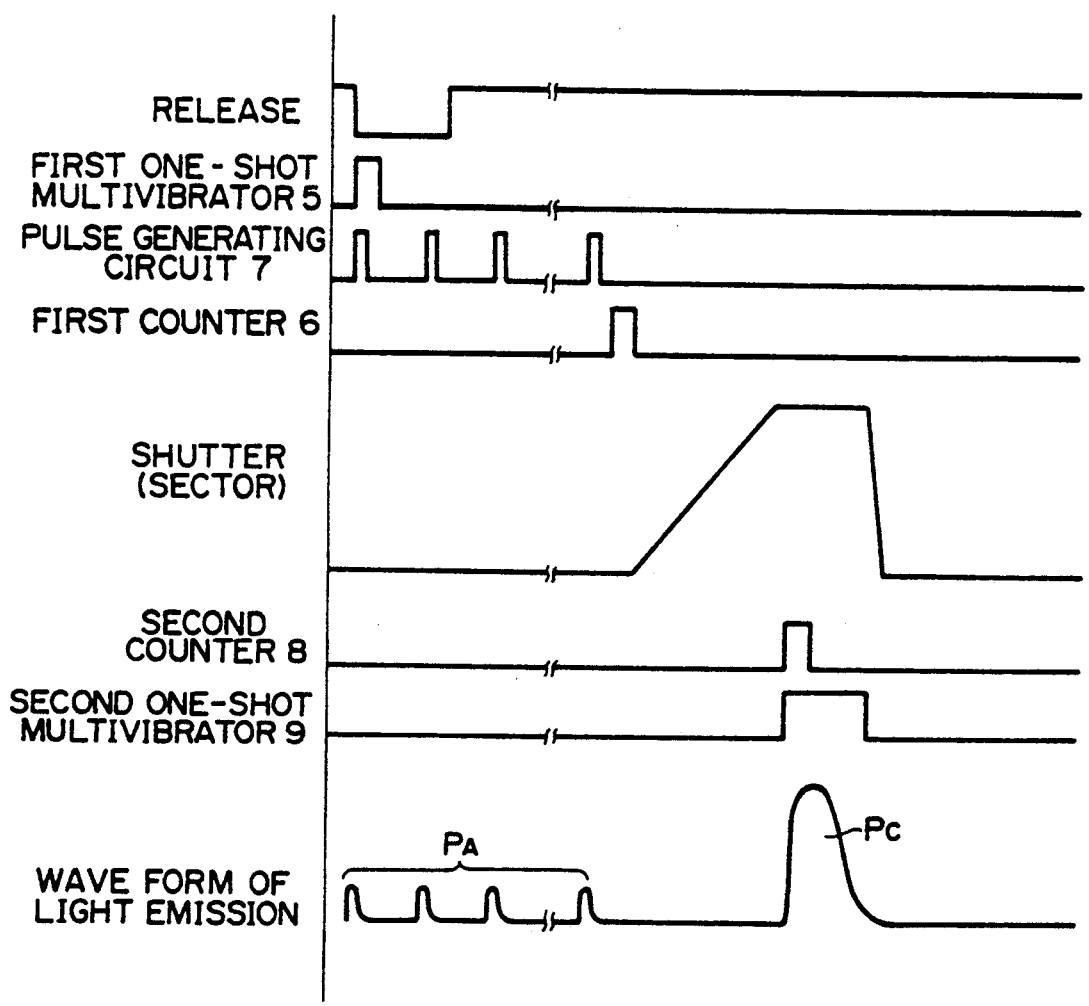
FIGS. 7 and 8 are time charts showing the operation of the flash device of a second embodiment.
Figure 8:
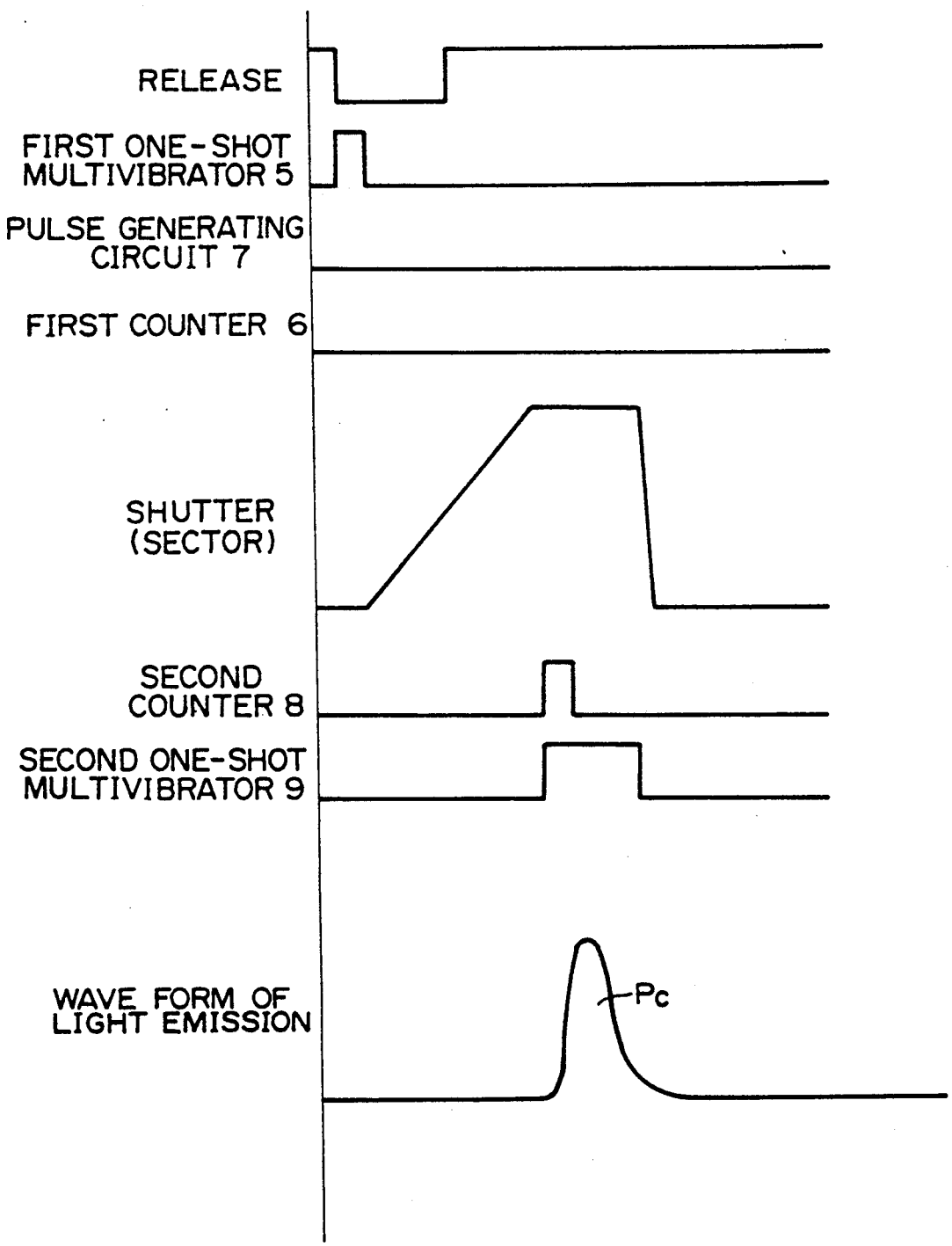

The second embodiment of the present invention will be described with reference to FIGS. 6 to 8.

Figure 6:
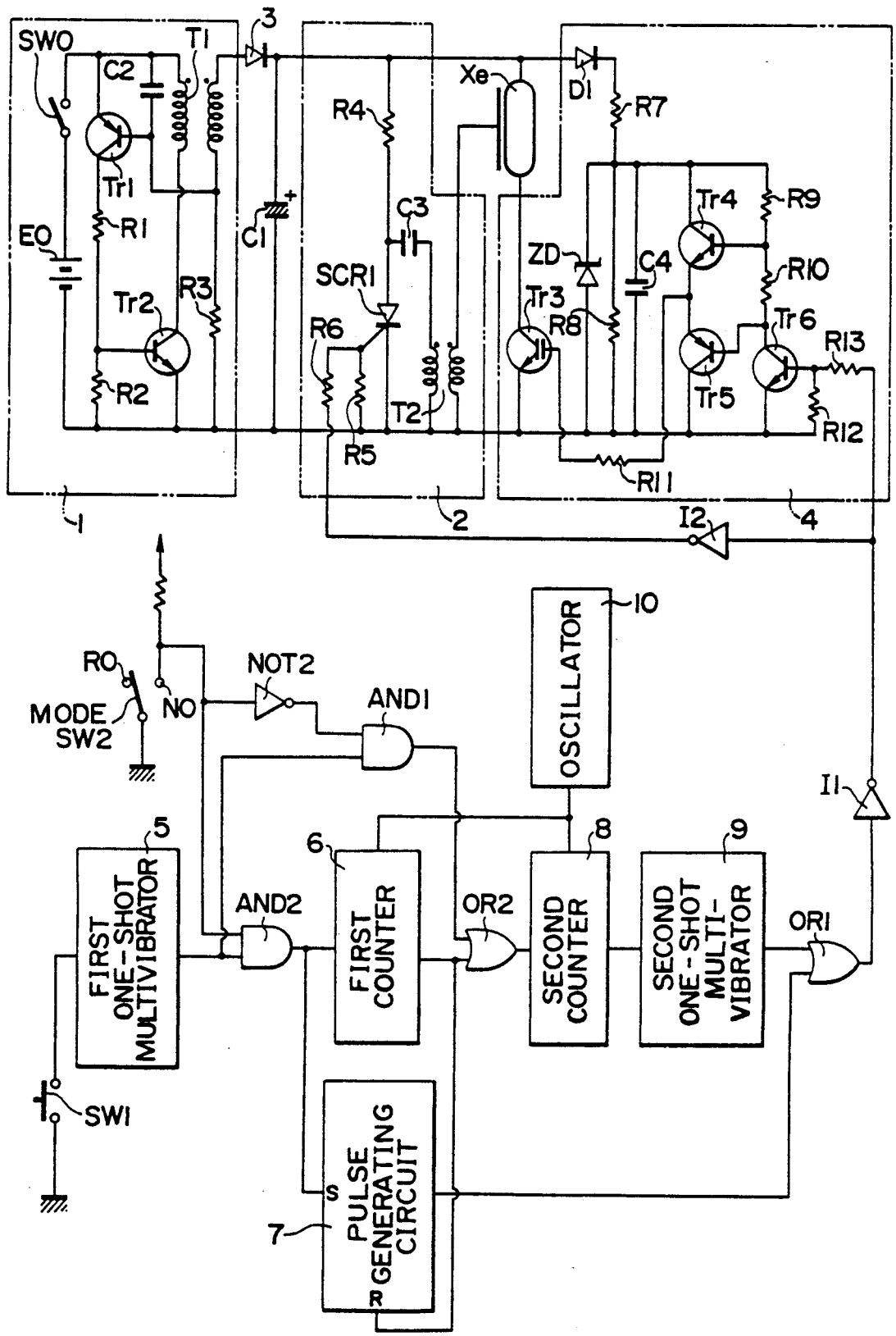
FIG. 6 is a circuit diagram showing a second embodiment of the flash device of the present invention.

A flash device in the second embodiment is identical with that in the first embodiment except that a mode switch Sw2 is added for selecting in advance either pre-flash for preventing red-eye phenomenon or main flash for photography as shown in the circuit diagram of FIG. 6. If a photographer switches the mode switch SW2 to the side of a terminal RO, a red-eye prevention mode in which main flash is conducted after pre-flash for preventing red-eye may be selected. If he (or she) switches the switch Sw2 to the side of a terminal NO, a conventional flash mode in which only main flash is conducted without pre-flash may be selected.

In other words, when the red-eye prevention mode is selected by switching the mode switch SW2 to the terminal RO, the second AND circuit AND2 is opened and the first AND circuit AND1 is closed, the circuitry in the second embodiment becomes identical with the circuitry in the first embodiment (refer to FIG. 5). The operation sequence at this time is shown in the time chart of FIG. 7. Flash picture taking is conducted in synchronization with the shutter after pre-flash.

When the conventional flash mode is selected by switching the mode switch SW2 to the terminal NO, the second AND circuit AND2 is closed and the first AND circuit AND1 is opened. The operation sequence at this time is shown in the time chart of FIG. 8. That is, when the release switch SW1 is turned on, a pulse is generated from the first one-shot multivibrator circuit 5. The pulse is passed through the first AND circuit AND1 to activate the second counter 8 via the second OR circuit OR2. After counting a given period of time, the second counter 8 generates an output to cause the second one-shot multivibrator circuit 9 to generates a pulse signal for flash. This pulse drives the light emitting control circuit 4 and the trigger circuit 2 to conduct a flash picture taking.

Figure 9:
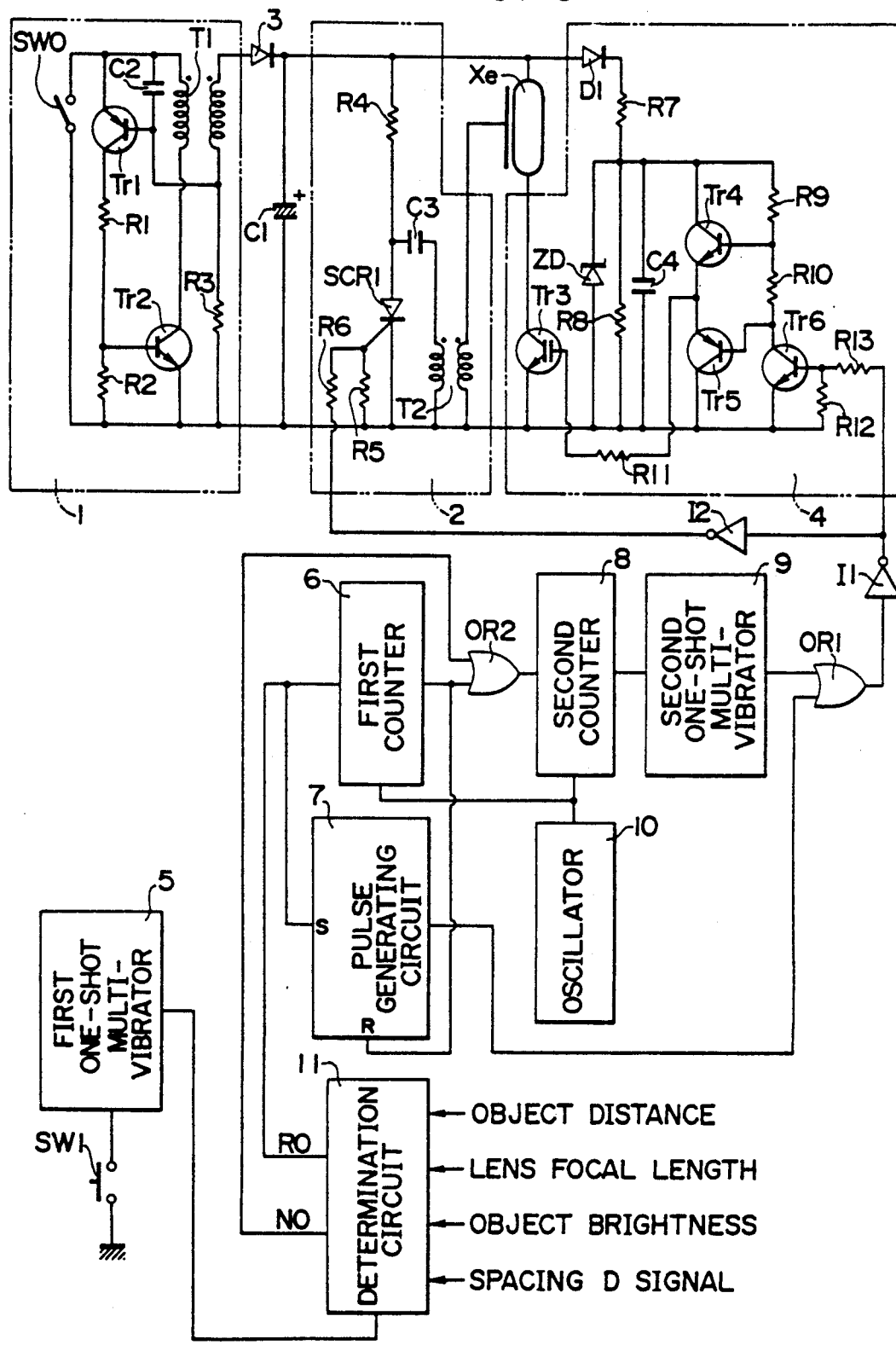
FIG. 9 is a circuit diagram showing a third embodiment of the flash device of the present invention.
Figure 10:
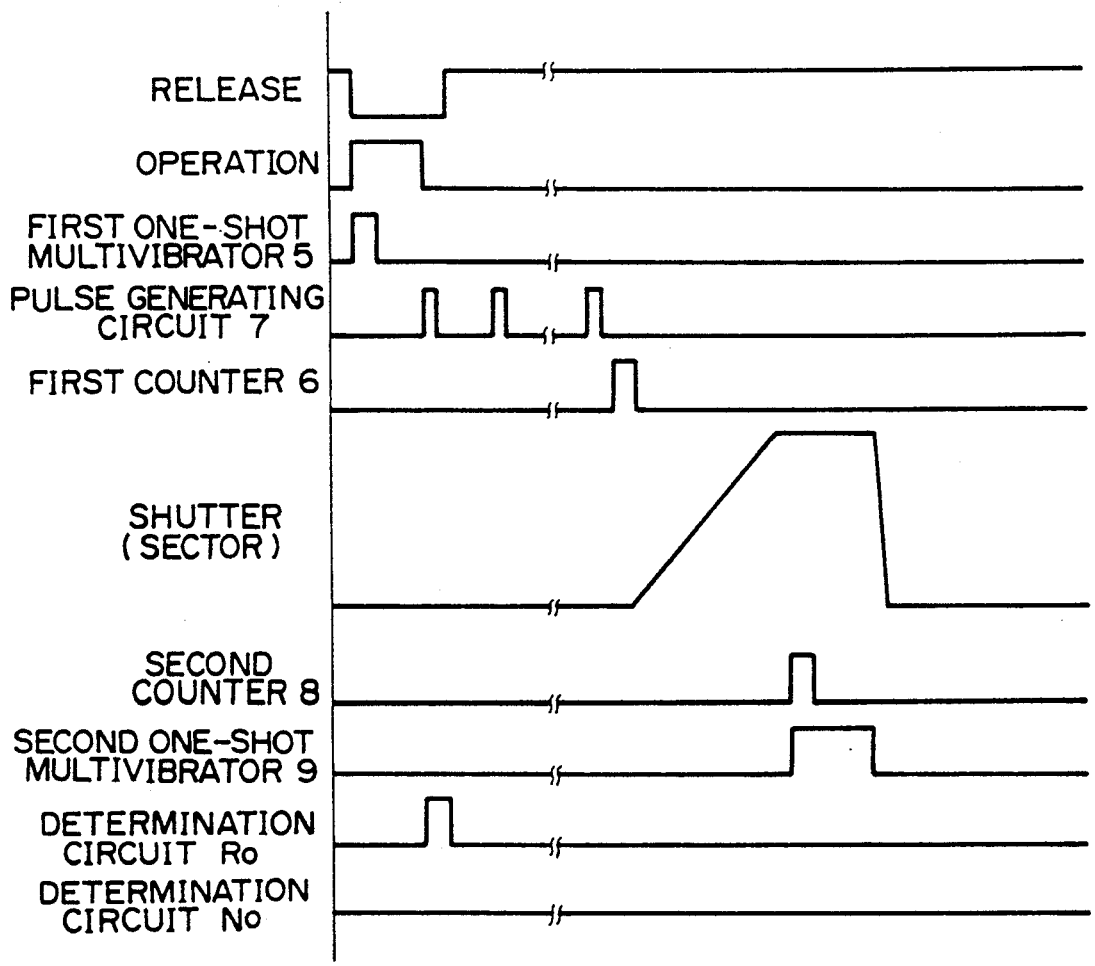
FIGS. 10 and 11 are time charts showing the relation of the signals in the flash device of a third embodiment of the present invention.
Figure 11:
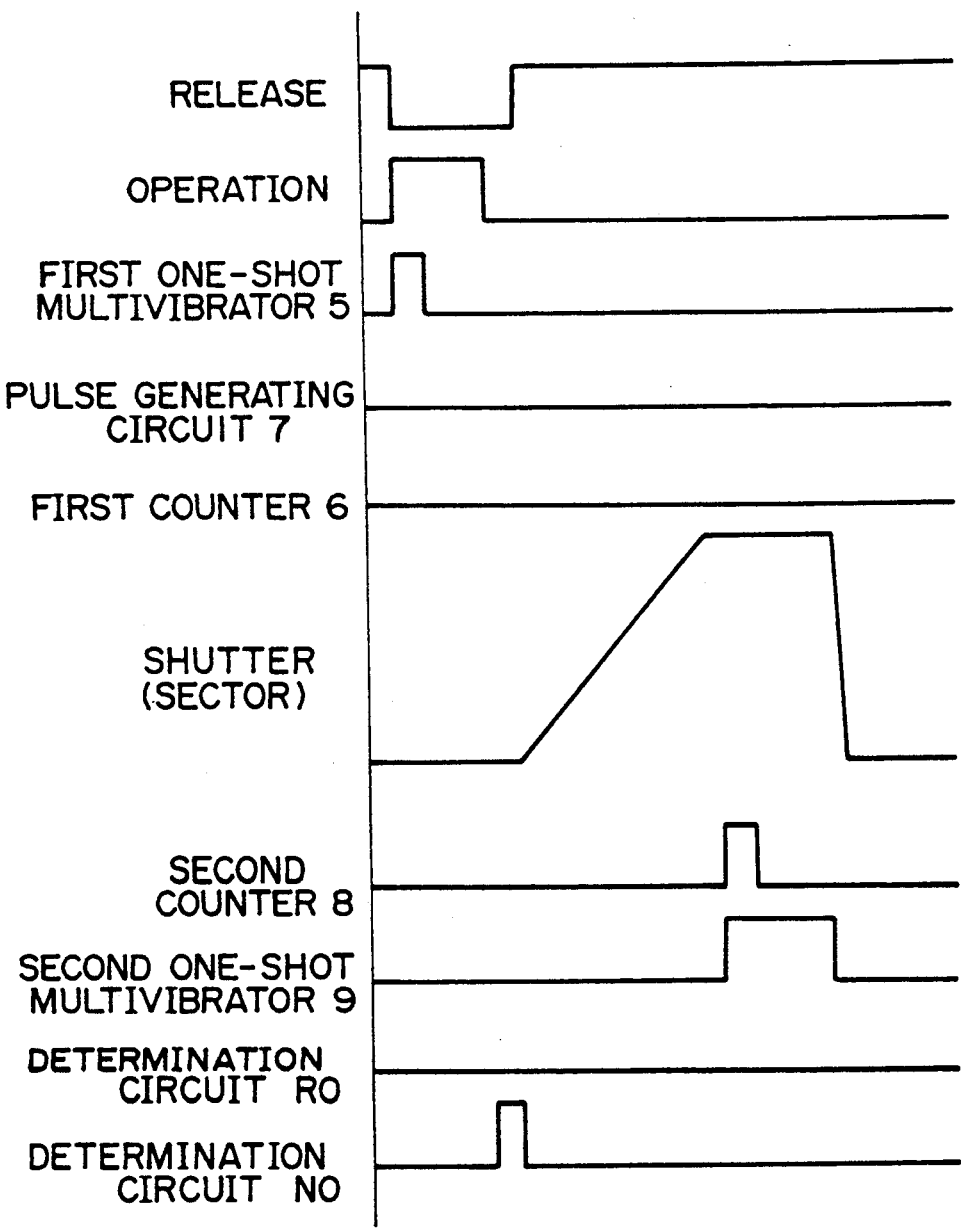

Referring now to FIGS. 9 to 11, there is shown a third embodiment of the present invention. While in the second embodiment of the flash device a red-eye prevention flash mode or usual or normal flash mode is selected by means of mode switch SW2, a determination circuit 11 into which a object distance information, lens focal length information, object brightness information, information of the distance between an electronic flash and a taking lens is inputted is adapted to determine whether or not red-eye phenomenon occurs and to automatically change the flash device into the red-eye prevention flash mode or the usual or normal flash mode, depending on the determination. If the determination circuit 11 determines that red-eye phenomenon will occur, a pulse signal for red-eye prevention is generated at the terminal R0 and is inputted to the first counter 6 and the pulse generating circuit 7 to perform pre-flash and to operate the shutter to perform main flash as shown in the time chart of FIG. 10.

When the determination circuit 11 determines that red-eye phenomenon will not occur, a pulse signal is generated at the terminal N0 to perform a sequential operation as shown in FIG. 11 to actuate the shutter to perform flash synchronized picture taking without pre-flash.

When the following formula (a) and (b) are satisfied, the determination circuit 11 determines that red-eye phenomenon will occur and outputs a pulse signal for red-eye prevention to the terminal R0.

$$\frac{d}{\tan 3°} < l \qquad (a)$$

wherein d represents a spacing between the optical axis of a taking lens and the center of a flash discharge tube Xe and l represents an object distance.

$$\frac{d}{\tan 3°} < l < 70f \qquad (b)$$

wherein d represents the aforesaid spacing: f represents the focal length; and l represents the object distance.

Figure 12:
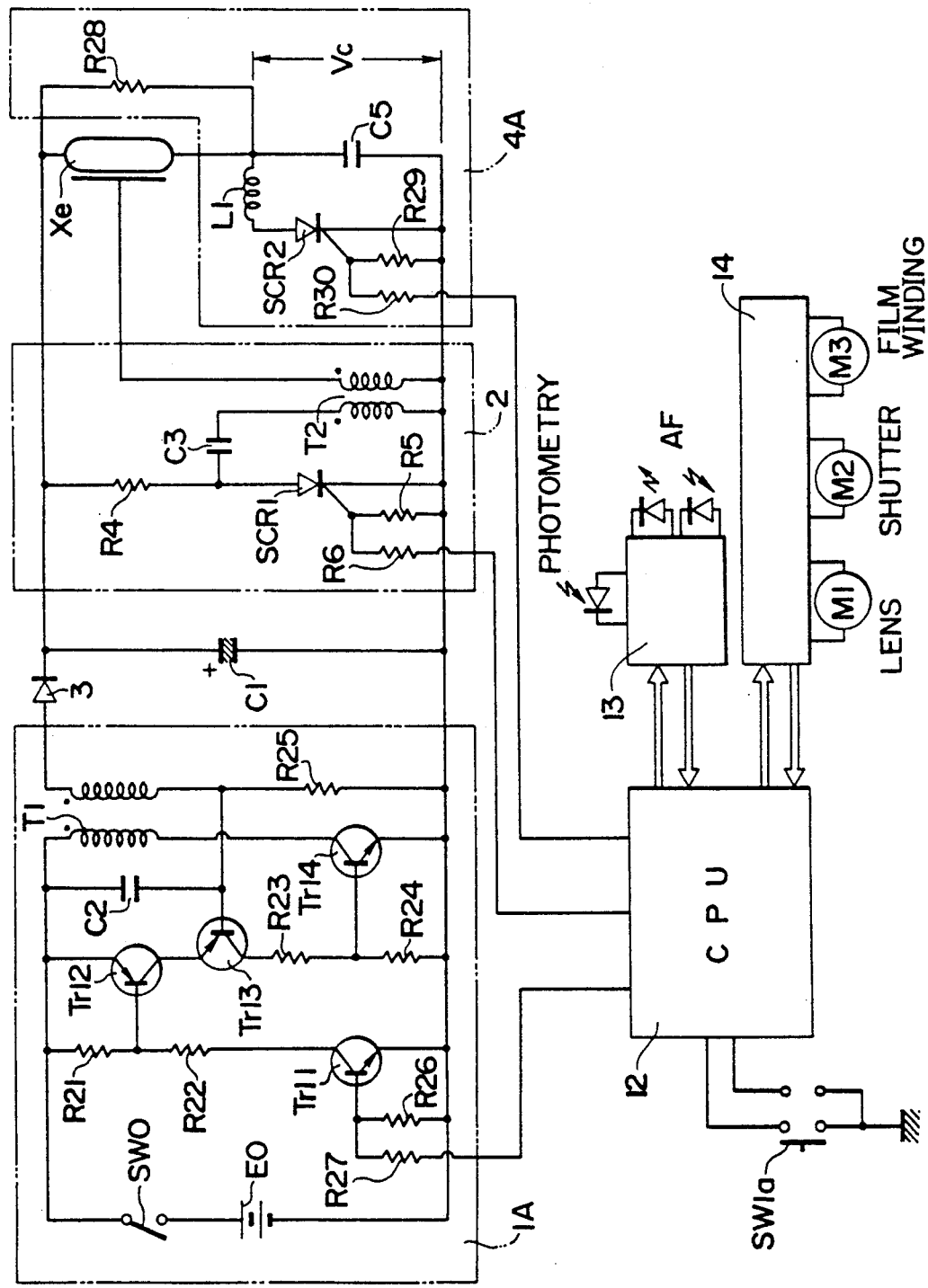
FIG. 12 is a circuit diagram showing a fourth embodiment of the flash device of the present invention.
Figure 13:
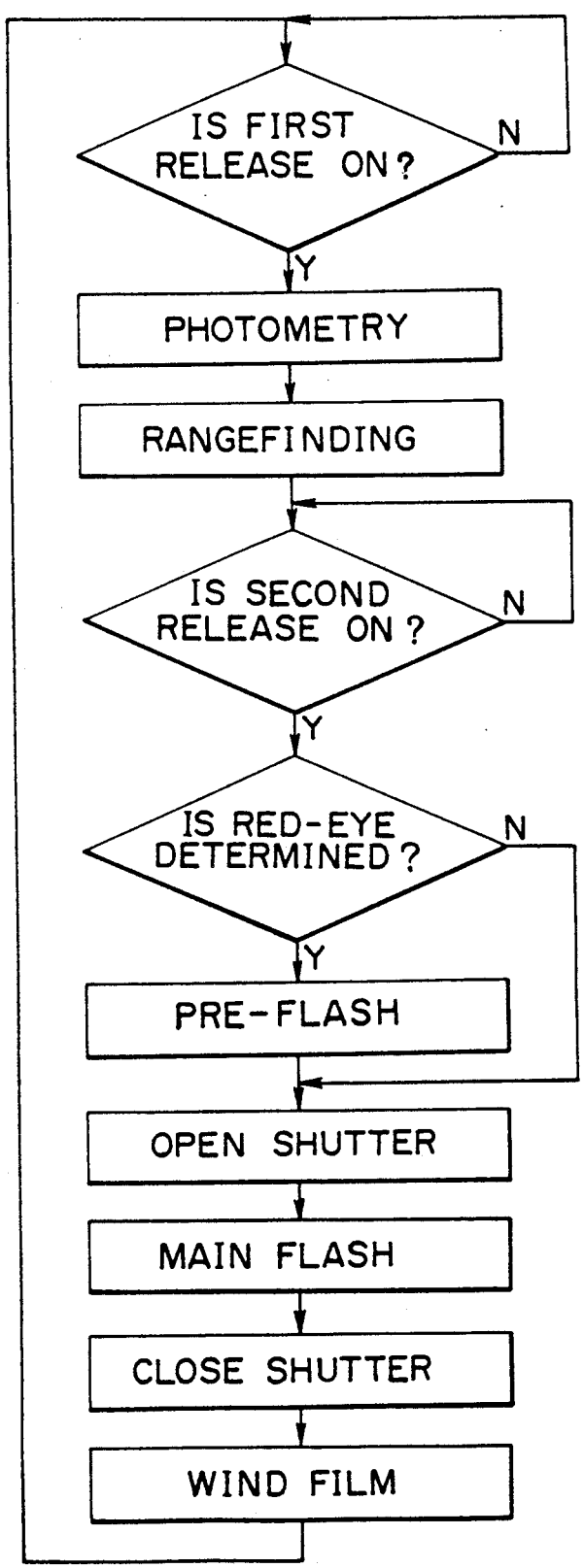
FIG. 13 is a flow chart showing the operation of the fourth embodiment of the flash device.
Figure 14:
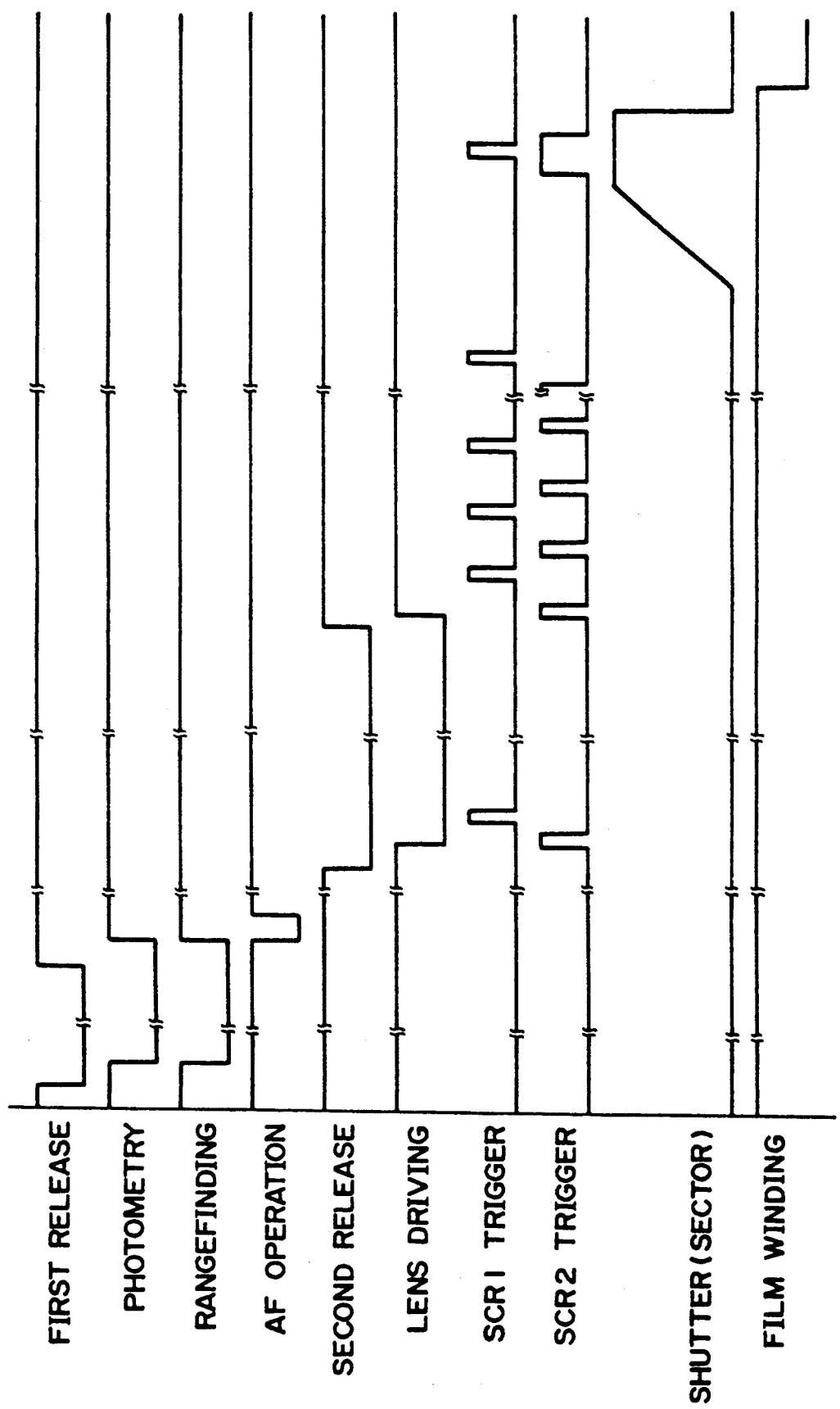
FIGS. 14 and 15 are time charts showing the relation of signals in the fourth embodiment of the flash device.
Figure 15:
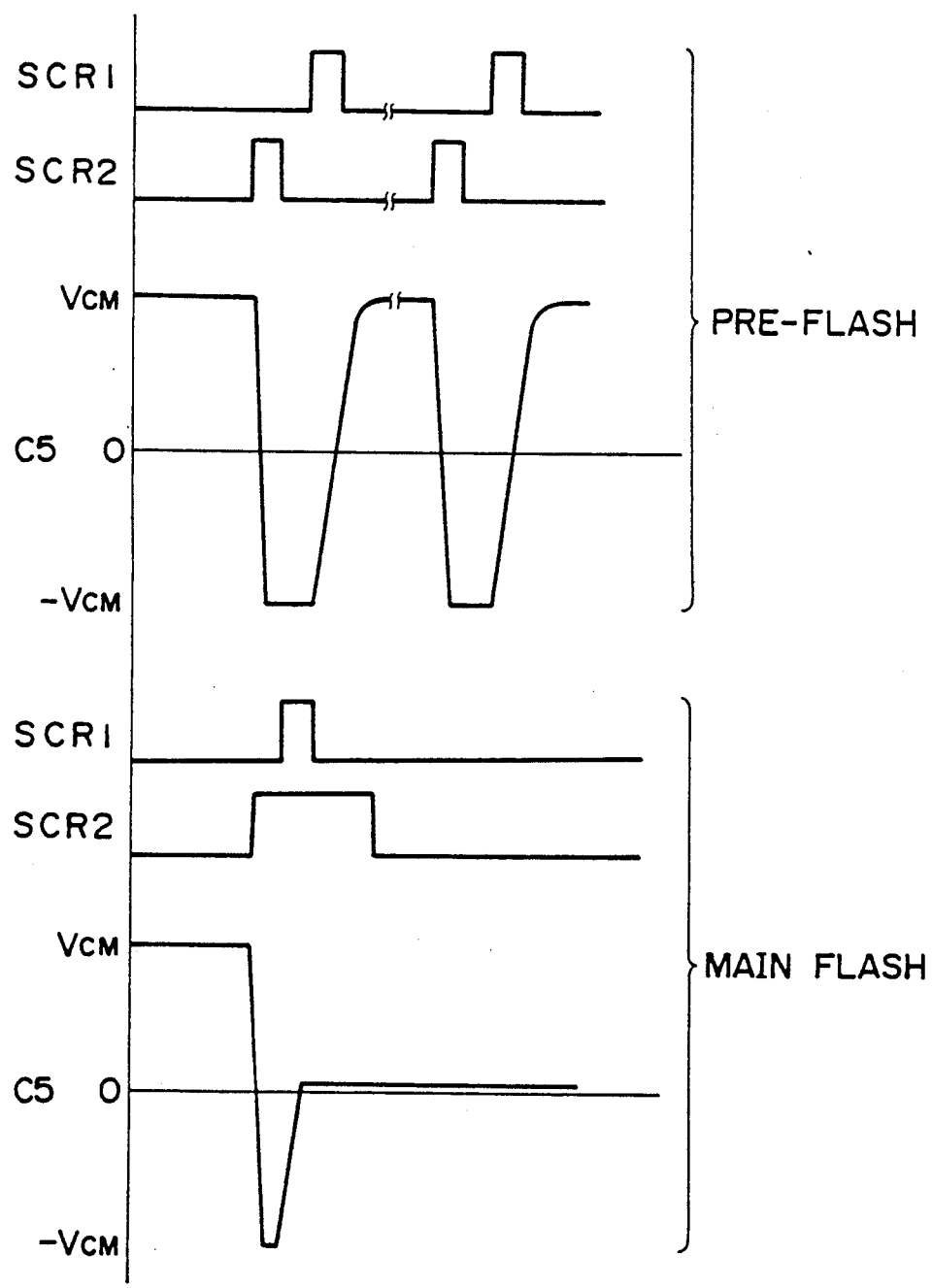

Referring now to FIGS. 12 and 15, there is shown a fourth embodiment of a full automatic camera of the present invention in which a camera in which photometry, rangefinding, exposure and film winding/rewinding are fully automatically operated has a built-in flash device of the present invention. A sequence controller which performs camera operation is comprised of CPU12. Photometry and rangefinding is conducted by a photometric and rangefinding driving circuit 13 controlled by the CPU. A taking lens, a shutter and a film are automatically operated by a lens driving motor M1, a shutter driving motor M2 and a film winding motor M3, respectively. Respective motors M1 to M3 are controlled by a motor control circuit 14. The CPU12 generates a photometry and rangefinding instruction on a first release operation in which the release switch SW1a is half depressed. The CPU12 determines whether or not red-eye effect occurs to generate a pre-flash or main flash signal on a second release operation which the switch SW1a is fully depressed.

The flash device comprises a voltage step-up power circuit 1A including a Dc-Dc converter; a main capacitor C1; a flash tube Xe, and a circuit control connected to the output terminal of a power source 1A through a rectifying diode 3, and a trigger circuit 2 of the discharge tube Xe.

The voltage step-up power circuit 1A comprises a series circuit of a transistor Tr11 and resistors R21 and R22; a series circuit of transistors Tr12 and Tr13 and resistors R23 and R24; a series circuit of a primary winding of a step-up transformer T1 and a transistor Tr14; a series circuit of a secondary winding of the transformer T1 and a resistor R25; and a capacitor C1 and resistors R26 and R27 as shown in the drawings. Since the step-up power circuit 1A is well known, the explanation of the operation will be omitted. However, Dc-Dc converter may be controlled in response to the "H" or "L" level of a signal applied to the transistor Tr11 from the CPU12.

Since the trigger circuit 2 is identical with that in the first to third embodiments, the description of the circuit 2 will be omitted.

The light emitting control circuit 4A comprises a series circuit of a resistor R28 and a capacitor C5 connected to the output terminal of the power circuit 1A; a series circuit of a coil L1 and a thyristor SCR2; and resistors R29 and R30.

The operation of the thus formed flash device will be described with reference to the time chart of FIG. 15. When the power switch SW0 is closed and CPU 12 outputs a driving signal to the voltage step-up power circuit 1A, the circuit 1A operates to charge main capacitor C1 and to charge capacitor C3 and capacitor C5 via a resistor R4 and a resistor R28 so that a potential thereacross is substantially equal to those across the main capacitor C1.

When a trigger signal is applied from CPU12 to the thyristor SCR2 which discharges the capacitor C5, the charge on the capacitor C5 is discharged through a solenoid L1 and the thyristor SCR2. Resonation by the capacitor C5 and the solenoid L1 causes the capacitor C5 to be charged in a reverse direction. Assuming the voltage of the main capacitor be VCM, the potential of the capacitor C5 and the flash discharge tube Xe becomes substantially minus VCM. This means that a voltage of 2 VCM will be applied to the discharge tube Xe to facilitate the discharge tube to emit light. The same effect as obtained by a conventional pull-down circuit may be obtained. When a trigger signal is applied to the thyristor SCR1 from the CPU12 at this time, the discharge tube Xe emits light. When the capacitor C5 is charged light emission will cease.

Pre-flash is made a plurality of times, each cycle of afore-mentioned operation being one cycle. In order to conduct the flash, a signal is applied to the thyristor SCR2 so that the voltage of the capacitor C5 becomes −VCM. Thereafter a signal is fed to the thyristor SCR1 to cause the discharge tube Xe to emit light. This increases the voltage of the capacitor C5. However, since a signal continues to be applied to the thyristor SCR2, discharged current of the discharge tube Xe is discharged via the thyristor SCR2 when the anode voltage of the thyristor SCR2, that is a voltage of the capacitor C5, exceeds a turning-on voltage of the thyristor SCR2. Thus, flash is conducted.

Next, the operation of the full automatic camera having a flash device will be described with reference to FIGS. 12 to 15. When the release switch SW1a is half depressed, photometry and rangefinding is conducted and the obtained data are stored in the CPU12 as shown in the flow chart in FIG. 13 and the time chart in FIG. 14. When the release switch is half depressed again, the stored data are updated with new data. When the release switch is fully depressed thereafter, a pulse for pre-flash is applied to the thyristor SCR2 from the CPU12 and then a pulse for discharge is applied to the thyristor SCR1 from the trigger capacitor C3. Application of the pulse is continued for a given period of time. Thereafter a shutter actuation signal is applied to a motor control circuit 14 from the CPU12. A synchronized pulse is applied to the thyristors SCR1 and SCR2 from the CPU12 when the shutter is opened. Then the camera closes the shutter and rewinds the film and returns to an initial state.

Although flash for picture taking is conducted simultaneously with the full opening of the shutter it is apparent that flash may be conducted even on partial opening of the shutter if a camera adopts a shutter such as a lens shutter in which flash can be synchronized with the shutter actuation at any shutter speed.

Figure 16:
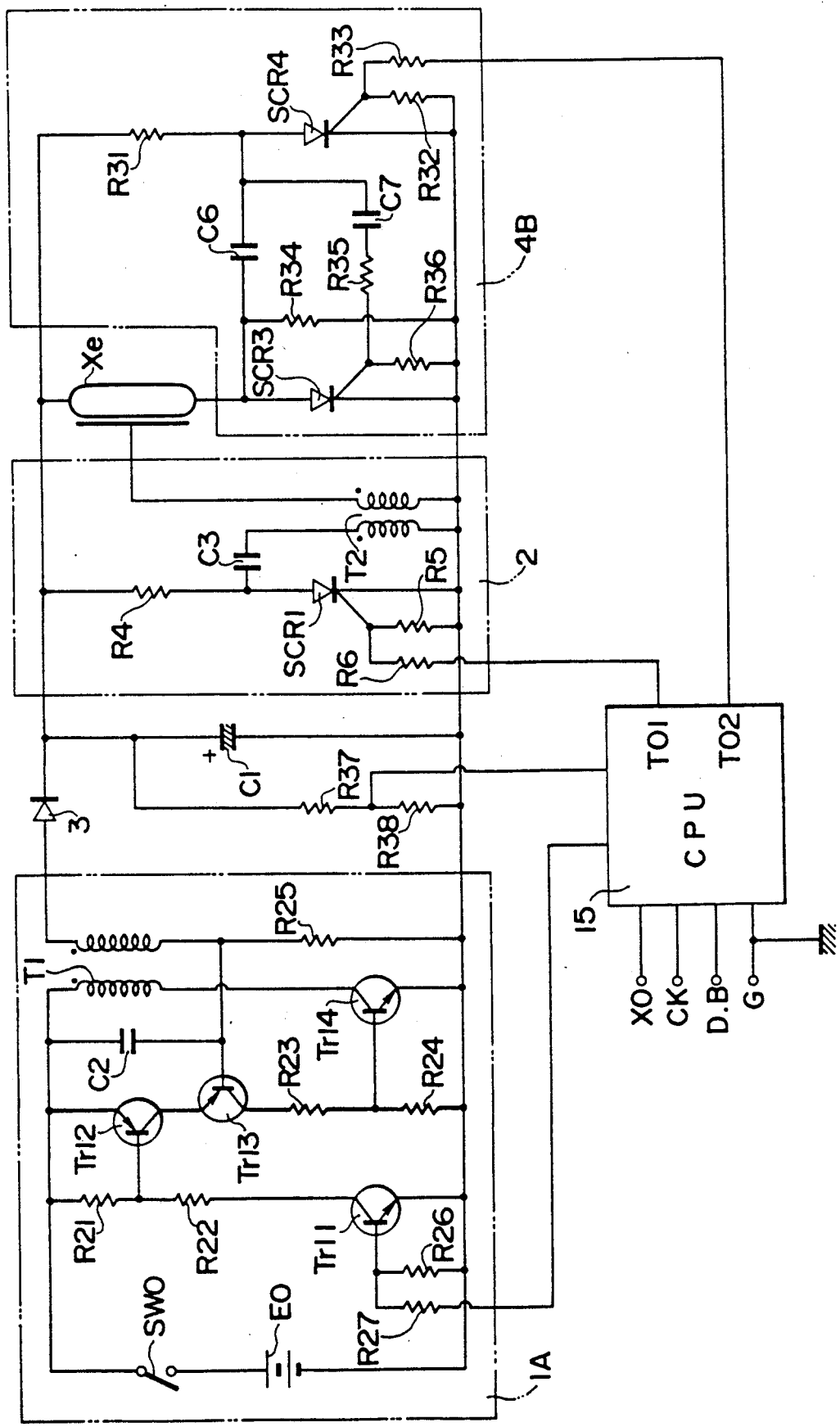
FIG. 16 is a circuit diagram showing a fifth embodiment of the flash device of the present invention.
Figure 17:
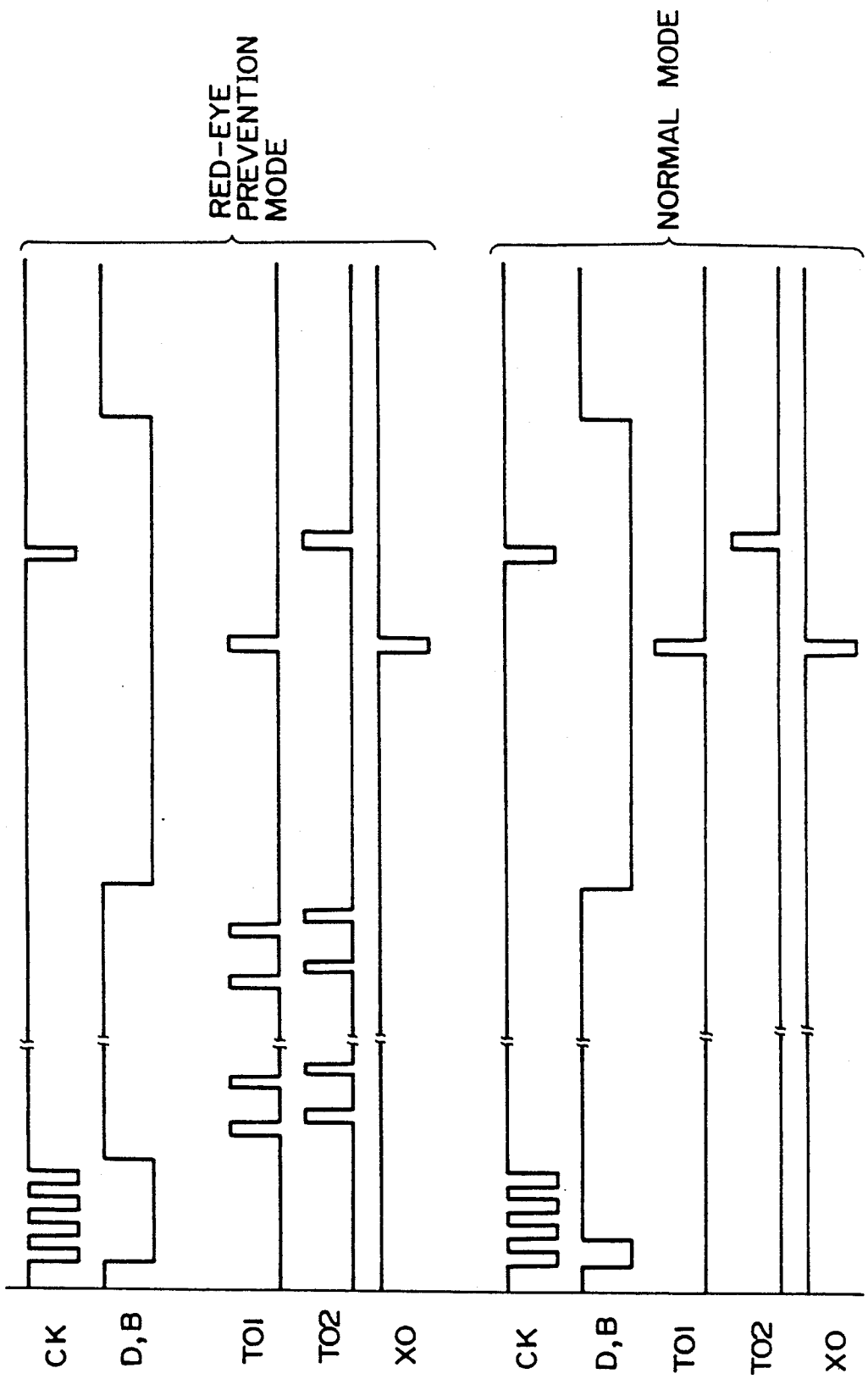
FIG. 17 is a time chart showing the relation of the signals in the fifth embodiment.

Referring now to FIGS. 16 and 17, there is shown a fifth embodiment in which a flash device is separated from a camera. The flash device is connected with the camera body (not shown) via a synchronization contact terminal $X_O$, a clock terminal CK, data bus terminals D, B and a ground terminal G.

In the flash device of this embodiment, a voltage step-up power circuit 1A and a trigger circuit 2 are identical with those in the forth embodiment (refer to FIG. 12). A light emitting control circuit 4B comprises a thyristor SCR3 which is series connected with a flash discharge tube Xe; a series circuit of a resistor R31 and a thyristor SCR4; capacitors C6 and C7 and resistors R32, R33, R34, R35 and R36 which are wired as shown in the drawing. The CPU 15 which controls the sequence of the operation of the flash control circuit receives at the A/D converter portion the voltage of the main capacitor C1 which is divided by resistors R37 and R38. When the divided voltage reaches a predetermined value, the transistor Tr11 of the voltage step-up power circuit 1A is turned off to control the charging voltage.

The operation of the thus formed flash device in the fifth embodiment will be described with reference to the time chart of FIG. 17. The transistor Tr12 is turned on by closing the power switch SW0 and by turning the transistor Tr11 on. Then the Dc-Dc converter begins to oscillate to charge the main capacitor C1, trigger capacitor C3 and capacitors C6 and C7 via the diode 3.

When the red-eye prevention mode is selected under these conditions, a pre-flash start signal is inputted to a clock terminal CK and data bus terminals D and B, then a pulse signal train as shown in FIG. 17 is generated at output terminal T01 and T02. When a pulse signal is generated at terminal T01 at first, a trigger voltage is applied to the flash discharge tube Xe, then a current flows through the discharge tube Xe, capacitor C6, capacitor C7 and thyristor SCR3 and the discharge tube Xe initiates discharge. When a pulse is then generated at the terminal T02, the thyristor SCR4 is turned on to discharge the charge which was stored in advance in the capacitor C6. The thyristor SCR3 is reversely biased so that it is turned off to cease light emission.

Pre-flash is conducted a plurality of times to prevent red-eye by repeating this operation with the pulses generated in order at terminals T01 and then T02. The intervals of the pulses are preset and the timing of switching from terminals T01 to T02 is preset in advance.

When the pre-flash is conducted, a shutter actuation signal is inputted to terminals D and B, then pre-flash is ceased in response to this signal. The shutter actuation signal is applied to the terminals D and B from the beginning of the shutter actuation to the closing of the shutter. The CPU 15 is provided with a timer which begins counting from the beginning of the pre-flash. When the timer times out, pre-flash is ceased. When a shutter actuation signal is generated at terminals D and B before the counter times out, this is determined as an abnormal condition in the circuit system and pre-flash is stopped.

When a signal is inputted to the terminal XO, the CPU generates an output at the terminal T01 to cause the discharge tube Xe to emit light. When the light emission amount becomes proper, a signal is inputted to the clock terminal CK and CPU 15 generates a signal at the output terminal T02 to stop light emission. Only when the data bus terminal D, B is at the "L" level and a synchronization light emission signal is inputted to the synchronization terminal XO, the CPU receives the signal.

When the normal light emitting mode is selected, normal mode signals are generated at the terminals CK and D, B. A signal is not generated at output terminals TO1 and TO2 until a signal is inputted to the terminal XO. When a synchronization light emitting signal is inputted to the terminal XO, a signal is generated at the output terminal TO1 and the discharge tube Xe begins emitting light. When the light emission amount reaches at a proper value, a signal is inputted to the terminal CK and CPU 15 generates a signal at the output terminal TO2 to stop light emission.

Figure 18:
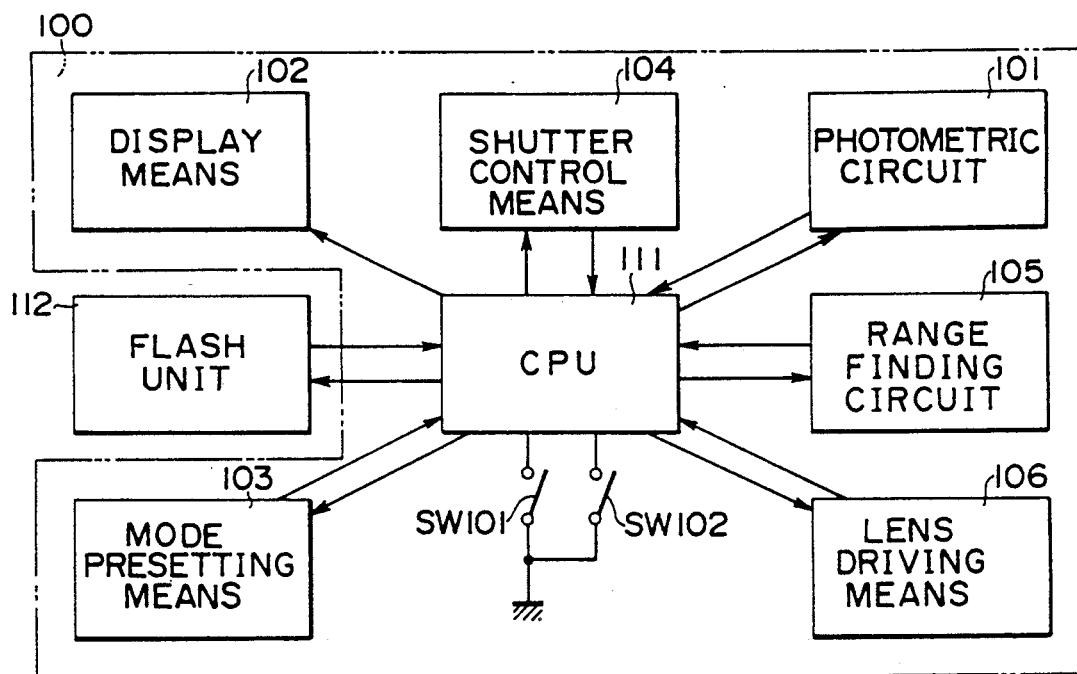
FIG. 18 is a block diagram showing the basic structure of a full automatic flash photographic apparatus which is a combination of the flash photographic apparatus which is a combination of the flash device of the present invention and a full automatic camera.

Referring now to FIG. 18, there is shown the basic configuration of a flash photographic apparatus which is a combination of a flash device of the present invention and a full automatic camera similar to the camera shown in FIG. 12. In this apparatus, a photometric circuit 101, a display means 102, a flash device 112, a mode presetting means 103, a shutter control circuit 104, a rangefinding circuit 105, and a lens driving means 106 are connected with the CPU111 provided in a camera body 100 as shown in FIG. 18. The CPU111 is also connected with a first switch SW101 which is turned on when a release button is half depressed and a second switch SW102 which is turned on when the release button is fully depressed.

Figure 19:
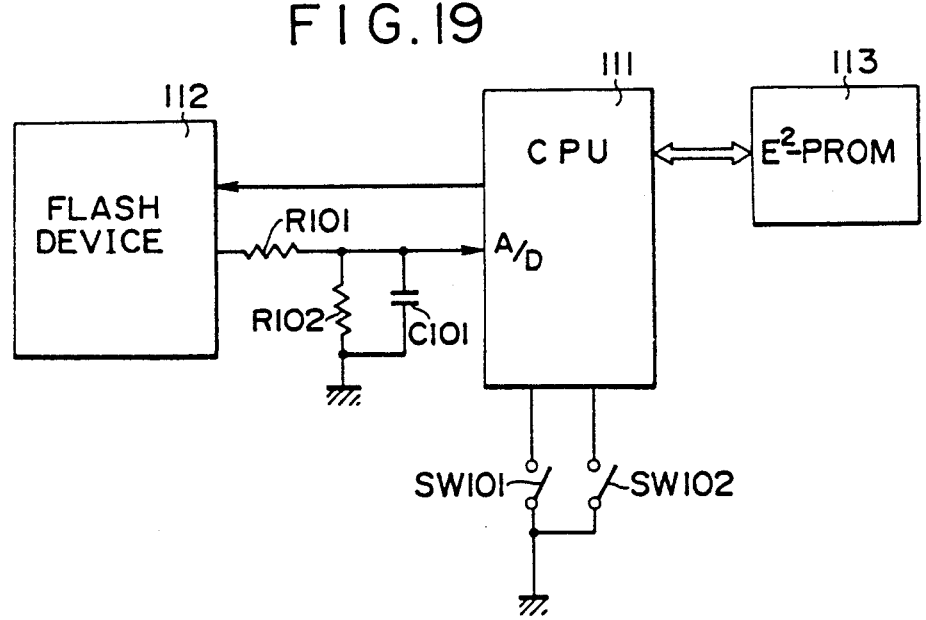
FIG. 19 is a circuit diagram showing a sixth embodiment of the flash device of the present invention.

FIG. 19 shows a sixth embodiment of the present invention in which connection between the CPU111 and the flash device 112 shown in FIG. 18 is shown in more detail. The output voltage of a main capacitor is applied to the A/D input terminal of the CPU111 through resistors R101 and R102 and a capacitor C101. The CPU is also connected with an $E^2$ PROM113.

When the switch SW101 is turned on by the half or first depression of the release button, the CPU111 actuates the photometric circuit 101 and the rangefinding circuit 105 and stores the information from the respective circuits. When the camera 100 and the flash device 112 are preset to flash photographic mode and normal flash mode (in which pre-flash is not conducted for reducing pupil size), respectively, the CPU operates to determine whether or not the photographic condition of the scene is a red-eye phenomenon occurring condition based upon a predetermined value (for example, the distance between the optical axis of a taking lens and a flash discharge tube) and an object distance from the rangefinding circuit 105 and causes the display means 102 to alarm a a red-eye condition where there is a likelihood of red-eye. When there is no likelihood of a red-eye an alarm is not displayed, the second switch SW102 is turned on by further depressing the release button. Then the lens driving means 106, the shutter control means 104, and the flash device 112 is operated to perform normal photographic operation. If a red-eye alarm is displayed, the flash device 112 is switched to the red-eye prevention mode via the CPU111 by means of mode presetting means 103. In this case, a flash device 112 slightly flashes once for reducing pupil size when the second switch SW102 is turned on. Then the lens is driven to move to a focussed position by the lens moving means. The flash device 112 repeats small flashes a plurality of times for reducing pupil size again in response to a signal representative of the driving completion (the aforementioned small flash is hereinafter referred to as pre-flash). After completion of pre-flash, the shutter control means 104 is operated to conduct opening and closing of the shutter. During opening of the shutter, the flash device 112 flashes for photography (this flash is hereinafter referred to as main flash).

Charging of the flash device 112 will now be described. A voltage which is equivalent to a voltage of the main capacitor of the flash device is divided by the resistors R101 and 102 and is inputted to an A/D port of the CPU111 and is then converted into a digital signal. When the digitally converted signal reaches a predetermined value, the operation of the DC/DC converter in the flash device 112 is stopped. In order to compensate for variations of resistance of the resistors R101 and R102, the resistances of the resistors are stored in $E^2$-PROM 113 as compensation data so that the charging voltage is precisely preset.

Figure 20:
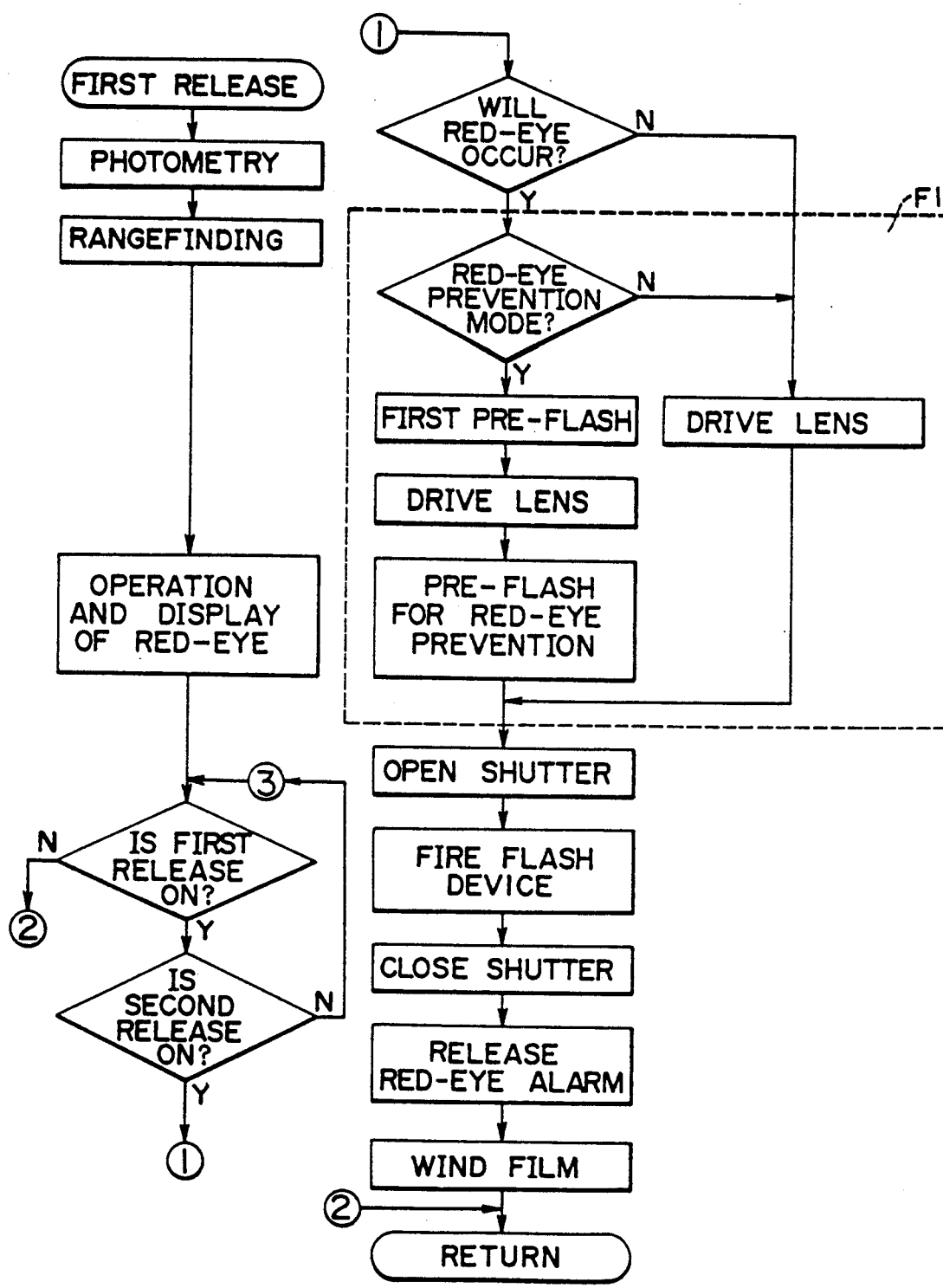
FIG. 20 is a flow chart showing the operation of the flash device of the sixth embodiment.
Figure 21:
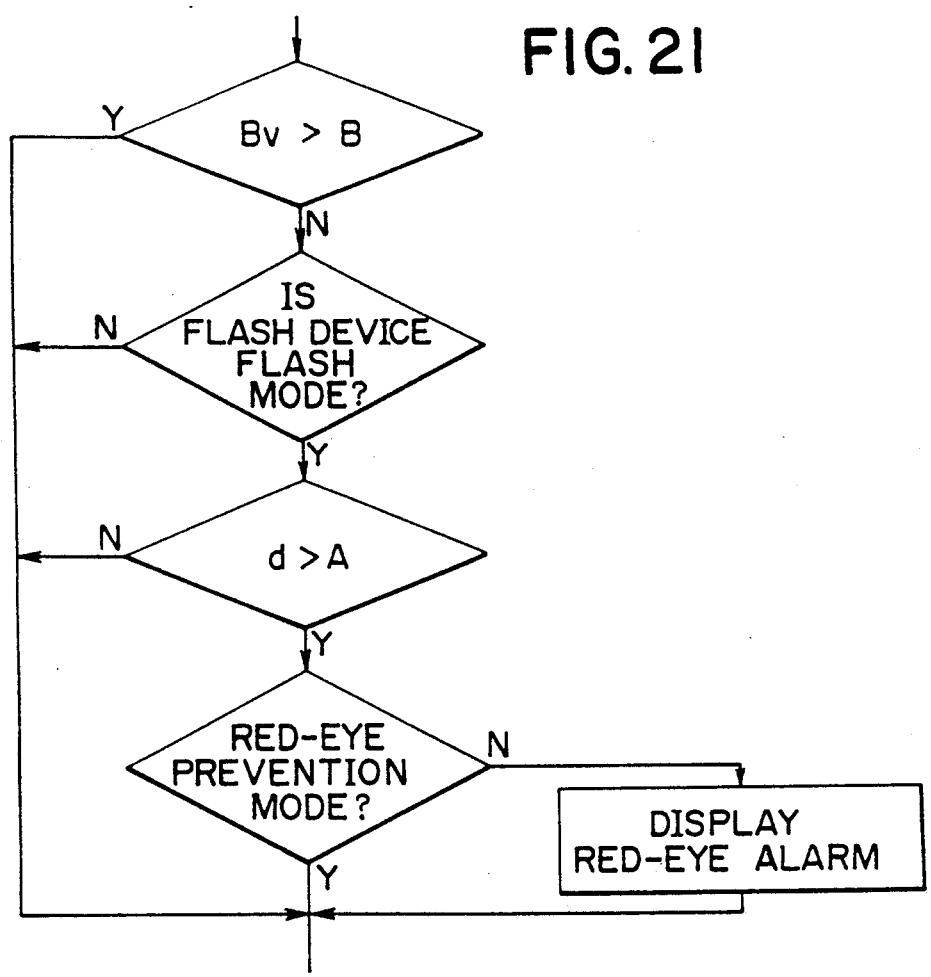
FIGS. 21 to 27 are flow charts showing variations of the flow chart shown in FIG. 20.
Figure 22:
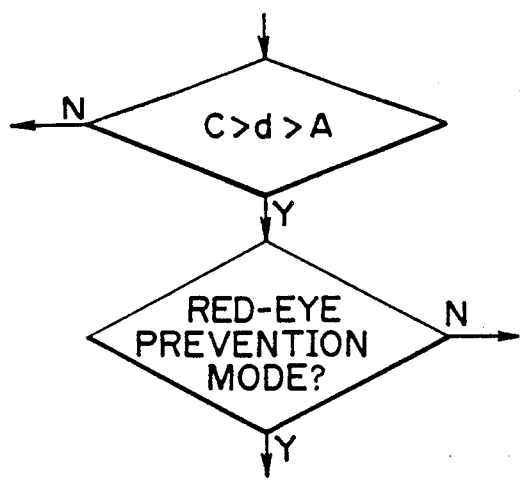
Figure 23:
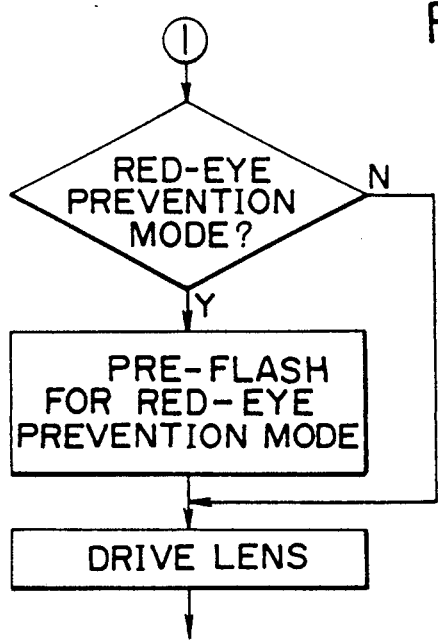

FIG. 20 is a flow chart showing the operation of the full automatic photographing apparatus shown in FIG. 18. Photometry and rangefinding operations are conducted and respective data are temporarily stored by the first or half depression of the release button. Based on these data and specific data of a camera (for example, the distance between the optical axis of a taking lens and a flash discharge tube and a brightness B at which red-eye phenomenon will not occur or will be difficult to occur), operation and display whether or not the photographing condition is a red-eye occurring condition is conducted. The operation and display includes comparing an output Bv from the photometric circuit with the brightness B. If $Bv > B$, the pupil has already been sufficiently contracted. That is, it is determined that red-eye will not occur and an alarm is not displayed. Then it is checked whether the apparatus is in a flash mode or not. If the apparatus is not in the flash mode, an alarm is not displayed. Then the object distance data d are compared with a predetermined red-eye occurring critical distance A. If $d \leq A$, it is determined that red-eye will not occur and an alarm is not displayed. If $d > A$, it is checked whether or not the apparatus is in a red-eye prevention mode. If the apparatus is not in the red-eye prevention mode, alarm of red-eye occurrence will be displayed. Taking into consideration a fact that an effective range of a flash light has a limit, operation in which alarm is normally displayed when d>A will not be performed and limitation C>d>A (wherein C represents fixed data), specific to a camera, representative of a critical range at which the flash light effectively reaches). A way of operation of these data is described in the copending U.S. patent application entitled "Camera having a Red-Eye Forecasting and/or Preventing Device" (FPO 3.0-545) Ser. No. 439,787 filed Nov. 21, 1989, by the assignee of the present invention, which is incorporated herein by reference. The specific conditions are as follows $$\frac{X1}{\tan 3°} < d \text{ or } \frac{X1}{\tan 3°} < D < 70f$$

wherein X1 represents the distance between the center of a flash discharge tube and the optical axis of a taking lens; and f represents the focal length of the taking lens.

Referring to FIG. 20 again, when the switch SW102 is turned on by the full or second depression of the release button, it is confirmed whether or not the photographing condition is a red-eye occurring condition (the result of operation performed after the half or first depression of the release button is confirmed). If it is not a red-eye occurring condition, the lens is driven to a focussing position based upon the measured distance data. The operation program executes steps of opening the shutter, main flash, closing the shutter and releasing red-eye alarm 1 (a release signal is outputted to return the flash device to an initial state even if a red-eye alarm is not provided), and winding a film and return. On the other hand, if the photographing condition is a red-eye occurring condition, it is confirmed whether the photographing apparatus is preset to a red-eye prevention mode. If not in the red-eye prevention mode, the lens driving is conducted based on measured distance data. If the apparatus is in the red-eye prevention mode, pre-flash is firstly conducted once (refer to the time charts of FIGS. 28 and 29). Thereafter the lens is driven. During driving of the lens, the pre-flash is not conducted. After the completion of the lens driving, pre-flash is conducted a plurality of time at intervals of a given period of time again. Although it is possible to conduct pre-flash during lens driving, malfunction and run-away of CPU111 may occur since the CPU executes operation and processing during lens driving and the high potential trigger signal generated on flash induces a high level noise, which may be inputted to a CPU port via connection lines and other patterns. Therefore it is better to prevent potential malfunction of CPU by avoiding pre-flash operation during lens driving as shown in FIGS. 20 and 28.

In this case, pre-flash is not conducted on the first depression of the release button and pre-flash operation is conducted in response to the second or full depression of the release button. The reason is because a time lag from the first to second depression depends on the depression speed of the release button and it may take 5 to 10 seconds from the first to second depression if an object distance is measured once on the first depression similarly with AF locking and thereafter composition is freely made by changing the camera angle.

If pre-flash is commenced from the first depression of the release button, too much total energy for pre-flash is consumed. More energy may be required for pre-flash than main flash. Since the period of time from the second depression to shutter opening is substantially constant, pre-flash is commenced in response to the stabilize the total energy for pre-flash and to provide a stable red-eye prevention effect.

When pre-flash for red-eye prevention is completed after repeating flash for a given period of time, an opening operation of the shutter is commenced. Thereafter main flash is conducted and then the shutter is closed. After the shutter has been closed, film is wound for next exposure and the operation program returns to an initial step.

Figure 30:
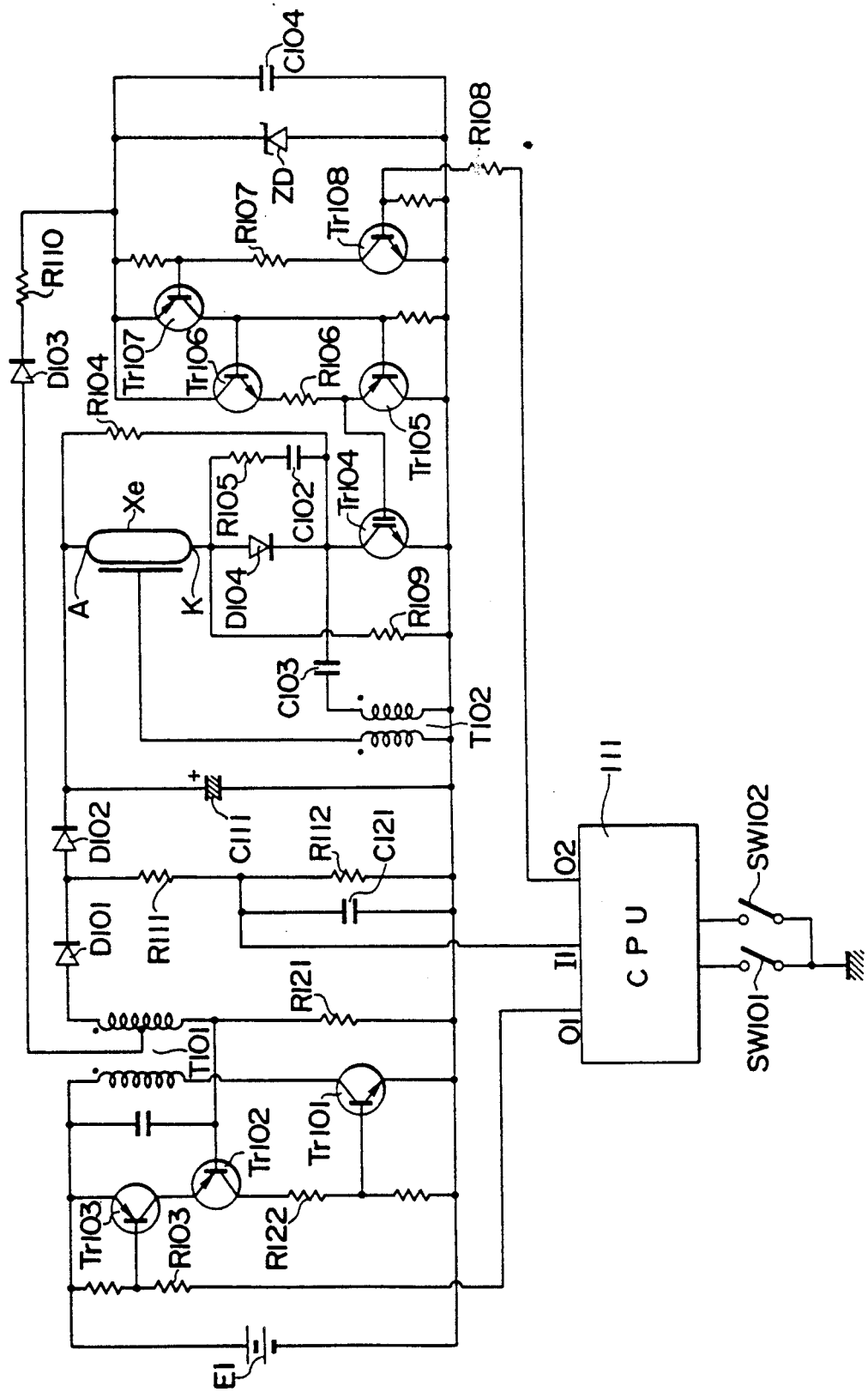
FIG. 30 is a circuit diagram showing the details of the flash device of the sixth embodiment.
Figure 31:
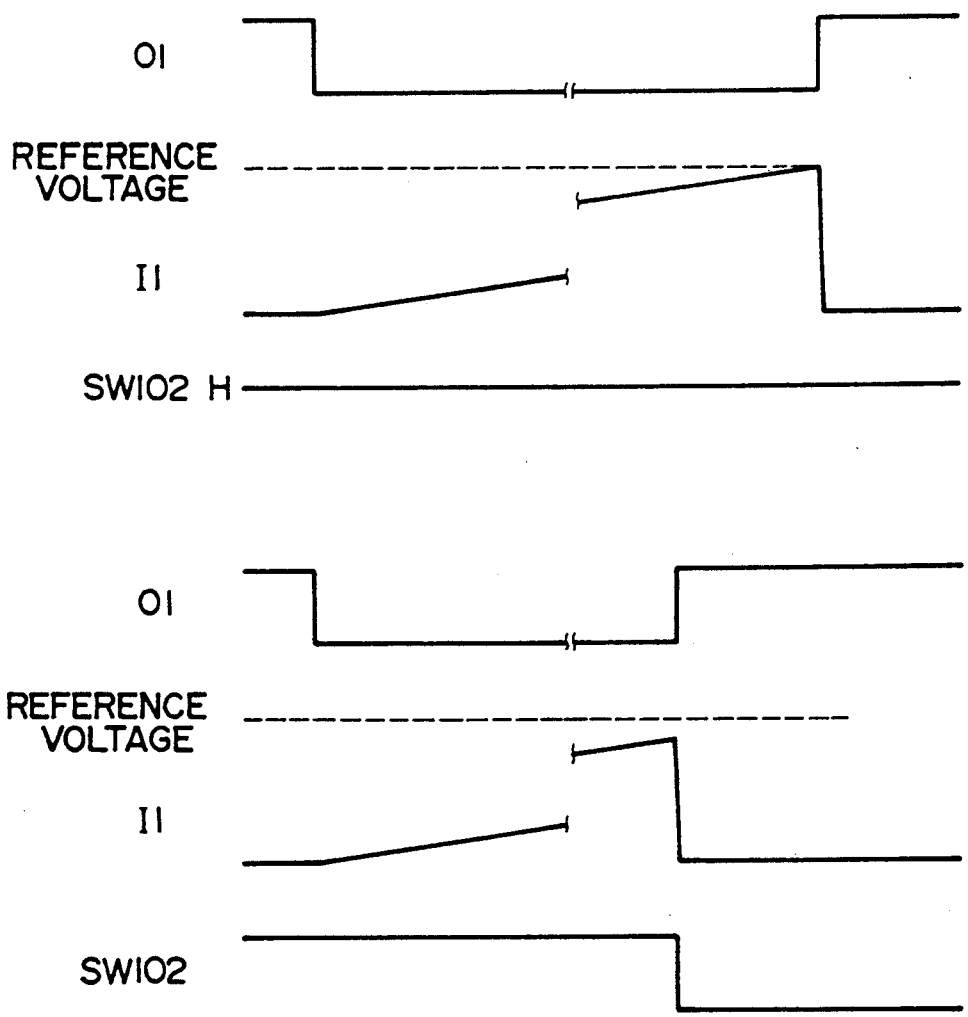
FIG. 31 is a time chart showing the signal relation of a conventional flash device.
Figure 32:
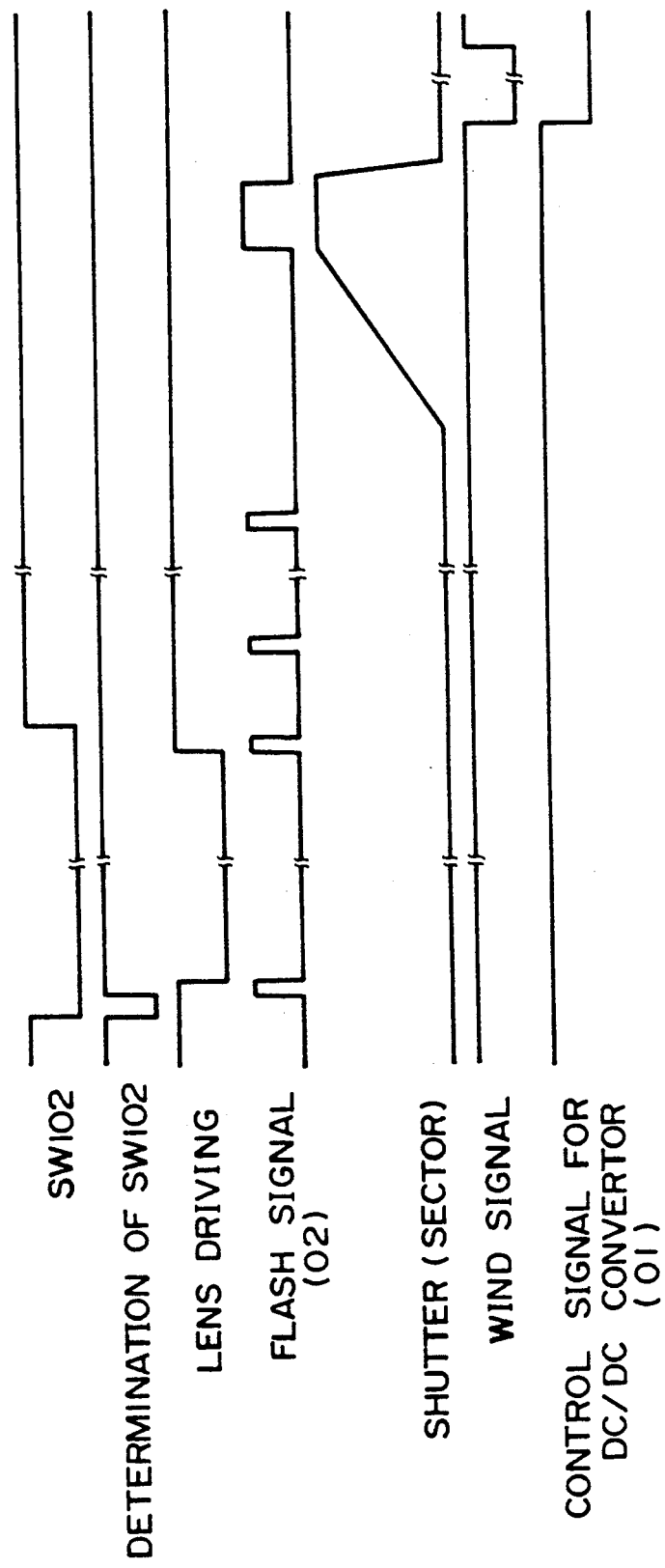
FIGS. 32 and 33 are time charts showing the signal relation of the flash device of the six embodiment of the present invention.

FIG. 30 shows a sixth embodiment of a flash circuit and connection between a flash device and CPU.

When the switch SW102 is turned on in response to the second or full depression of the button, a signal 01 from the CPU111 is changed from H to L and a transistor Tr103 is turned on to perform oscillation operation of the step-up circuit for charging a main capacitor C111 as is well known.

Resistors R111 and R112 divide a voltage approximately the same as that across the capacitor C111 and input the divided voltage to an A/D terminal I1 of CPU111. Reference C111 represents the main capacitor and T102 represents a transformer for triggering. The transformer T102, capacitor C103, resistor R109 and transistor Tr104 form a trigger circuit. The transistor Tr104 represents an IGBT, an element which is capable of controlling a large current at a moment (note also transistor Tr3 of FIG. 5).

Resistor R104, capacitor C102, resistor R105, and diode D104 form a double voltage circuit which applies a voltage double across the main capacitor C111 to a flash tube Xe and across the A and K terminals for suppressing the flash initiating voltage of the flash tube Xe. Transistors Tr105, Tr106, Tr107 and Tr108 form a gate control circuit which receives a light emission signal from the terminal 02 of CPU111 through resistor R108 for controlling the gate of the transistor Tr104. Diode D103, resistor R110, diode ZD, and capacitor C104 form a power circuit for supplying a gate voltage for transistor Tr104.

When the output from the output terminal 02 of CPU111 is at the L level and a signal is not generated across the resistor R108, transistors Tr108, Tr107 and Tr106 ar turned off. Accordingly the transistor Tr104 is also turned off since the gate of the transistor Tr104 is not biased.

When a flash signal is generated from the terminal 02 of CPU111, transistors Tr108, Tr107 and Tr106 are turned on and transistor Tr105 is rendered non-conductive so that the transistor Tr104 is rendered conductive since the gate of the transistor Tr104 is biased via the resistor R106. The capacitor C103 is charged in advance via resistor R104 to the voltage across the main capacitor C111. The capacitor C102 is charged in advance to the voltage across the capacitor C111 via the resistors R104, R105, and R109.

Accordingly, when the transistor Tr104 is turned on, the charge on the capacitor C103 is discharged through a primary winding of the transformer T102 via the transistor Tr104 so that a high voltage is induced across the secondary winding of the transformer T102 to cause ionization in the flash tube Xe. Simultaneously, the cathode voltage of the flash tube Xe is lowered to −V across the capacitor C111 via the capacitor C102. As a result, a voltage double the voltage across the main capacitor C111 is applied to the A-K terminals of flash tube Xe, making it easy to conduct light emission of the flash tube Xe. Then, the flash tube Xe commences light emission. The light emission current discharges through capacitor C111, flash tube Xe, diode D104 and capacitor C111 to cause the tube Xe to emit light. When the light emission signal from 02 of CPU disappears thereafter, transistors Tr108, Tr107, and Tr106 are turned off and simultaneously the transistor Tr105 is turned on. Therefore, the gate of the transistor Tr104 is short-circuited by the transistor Tr105 so that the transistor Tr104 is turned off at a moment. Hence, charge is charged on the capacitor C104 via flash tube Xe at a moment and simultaneously flash tube Xe stops light emission. Then, preparation for the next light emission is completed simultaneously with the completion of the light emission. That is, transistor Tr104 in the present circuit performs three functions of trigger circuit, double voltage circuit and a main switching element for light emission. Since a part of the afore-mentioned circuit has been described in the above-described first to fifth embodiments, the detailed description of it will be omitted herein.

A charging control system will be described with reference to FIGS. 23 to 27, 30 to 33.

Figure 24:
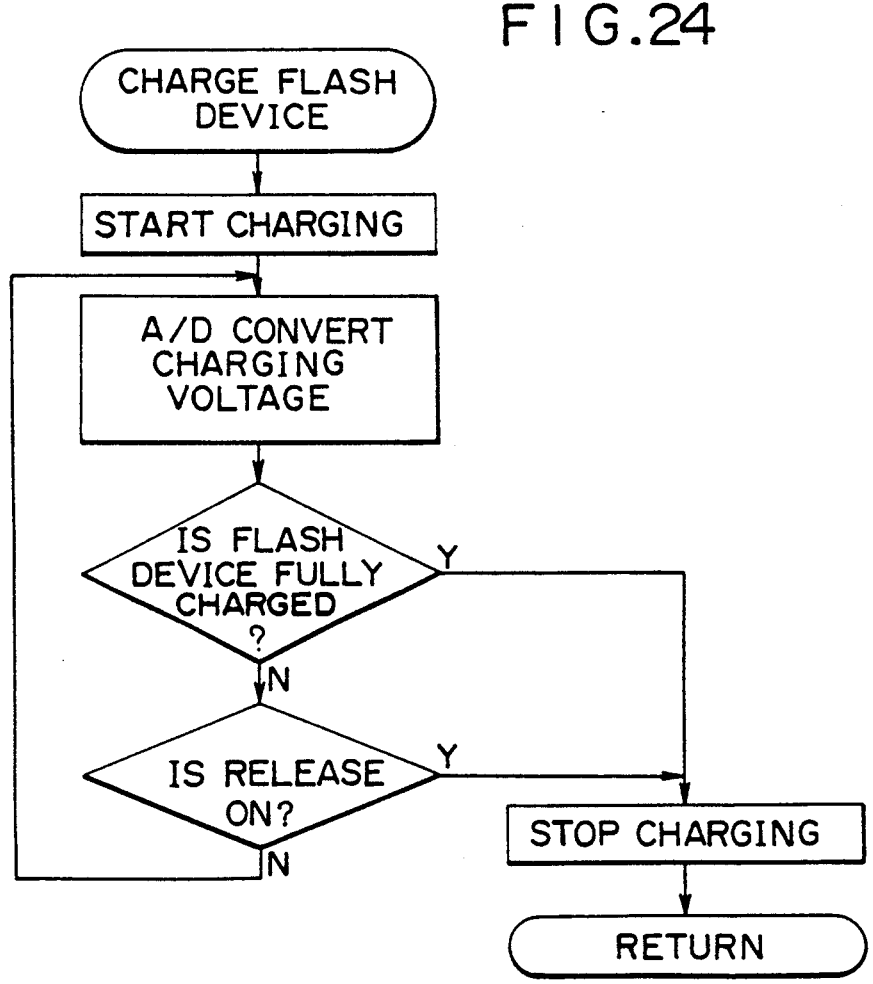
Figure 25:
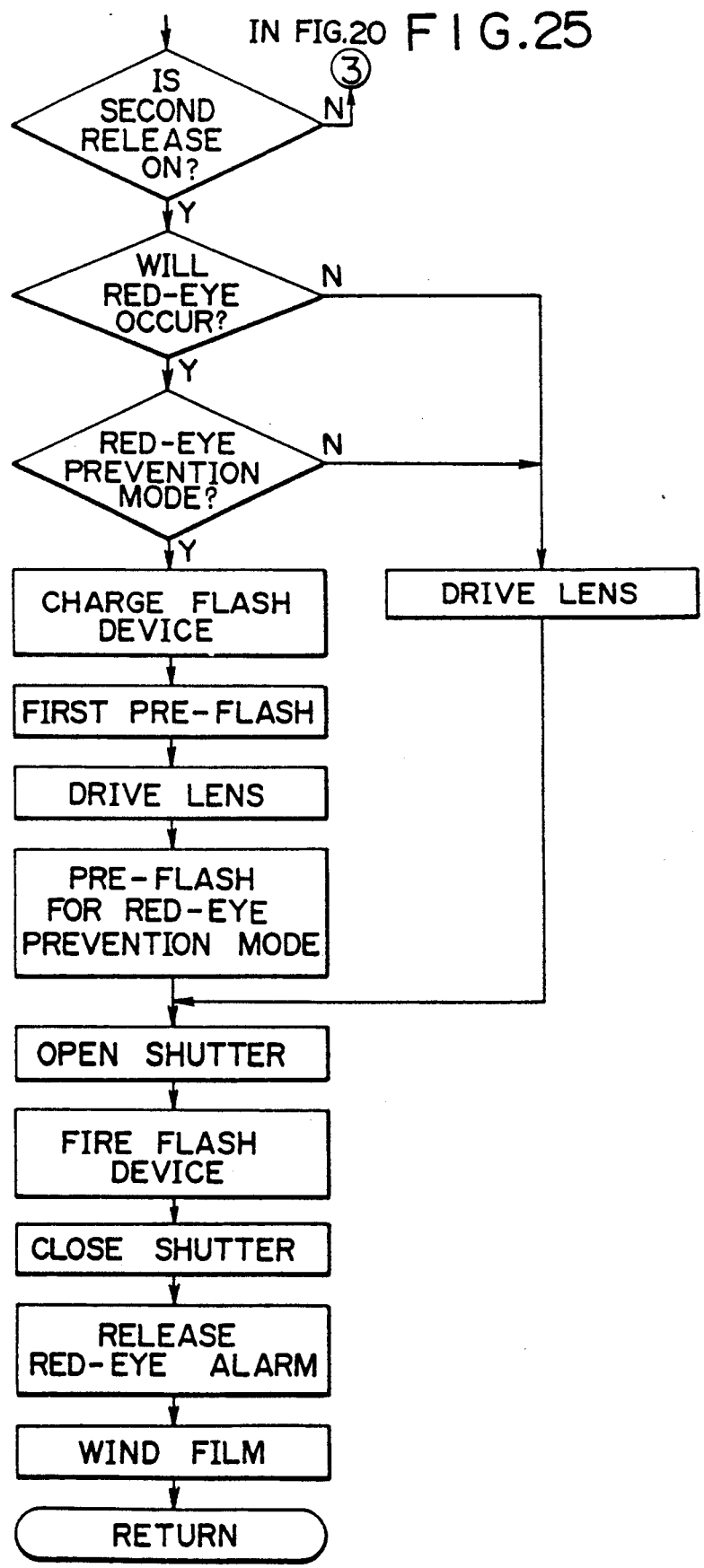

The afore-mentioned first to fifth embodiments utilize a conventional charging control system. That is, as shown in FIG. 24, charging is commenced with turning on a power switch (not shown). A voltage equal to that across a main capacitor is divided by the resistors R101 and R102 (refer to FIG. 19) and the divided voltage is inputted to an A/D terminal of the CPU111 at which the inputted voltage is converted into a digital value. The CPU111 determines to stop charging when the converted digital value reaches a predetermined value. When CPU 111 determines that second depression of the release button was made during charging, it stops charging even if the flash device has not been fully charged (refer to FIG. 31). Thereafter if charging is completed or flash is possible even though charging is not completed, pre-flash, lens driving, shutter opening, main flash, shutter closing, film winding and recharging is conducted (refer to FIG. 32). However, since pre-flash should be conducted, the capacity of the main capacitor is increased by an amount required for pre-flash and the period of time for charging the capacitor is extended.

Figure 26:
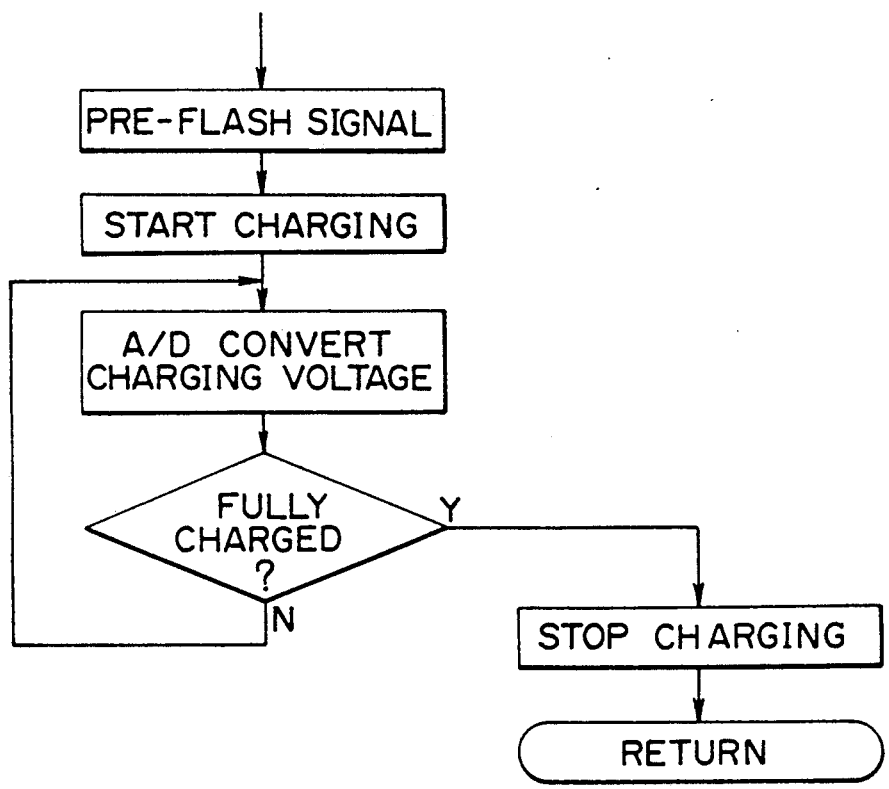
Figure 33:
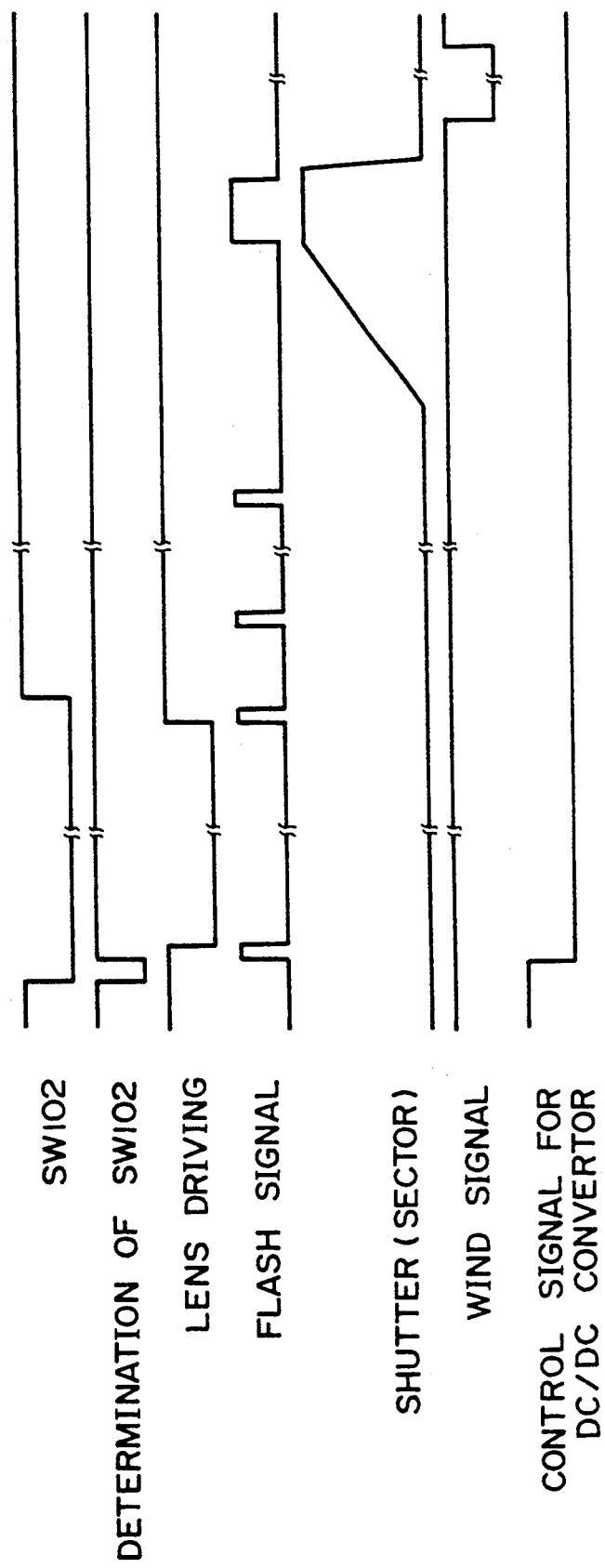

Therefore, recharging is started in response to the second depression of the release button in the present embodiment (refer to FIG. 26 and 33). If the pre-flash is small, recharging can compensate for the loss of the energy consumed for pre-flash. That is, main flash can be conducted if recharging to the conventional capacitor is conducted. The disadvantage of the previous embodiments can be overcome. More specifically the amount of emittable light (GNo) depends on the energy charged on the main capacitor and the size of the main capacitor depends on the amount of the energy which is charged thereon. If the total amount of the energy to be charged is represented as Et, the total amount of the energy consumed by plural pre-flashes is represented as Ep and the total amount of the energy consumed by main flash is represented as Em, Et=Em and Ep is compensated for at the second depression of the release button in the present embodiment while Et=Ep+Em in the previous embodiments. Such recharging operation is made possible since it takes 0.7 to 0.9 second from the second depression to main flash and the amount of light emission for pre-flash should not be large. In the operation shown in FIG. 33, there is a likelihood that the energy discharged for pre-flash becomes larger than the energy supplied by the DC/DC converter in dependence on the battery condition, so that the voltage may exceed the rated voltage of the main capacitor.

In this case, energization and deenergization of the DC/DC converter is conducted in response to a pre-flash signal.

Figure 27:
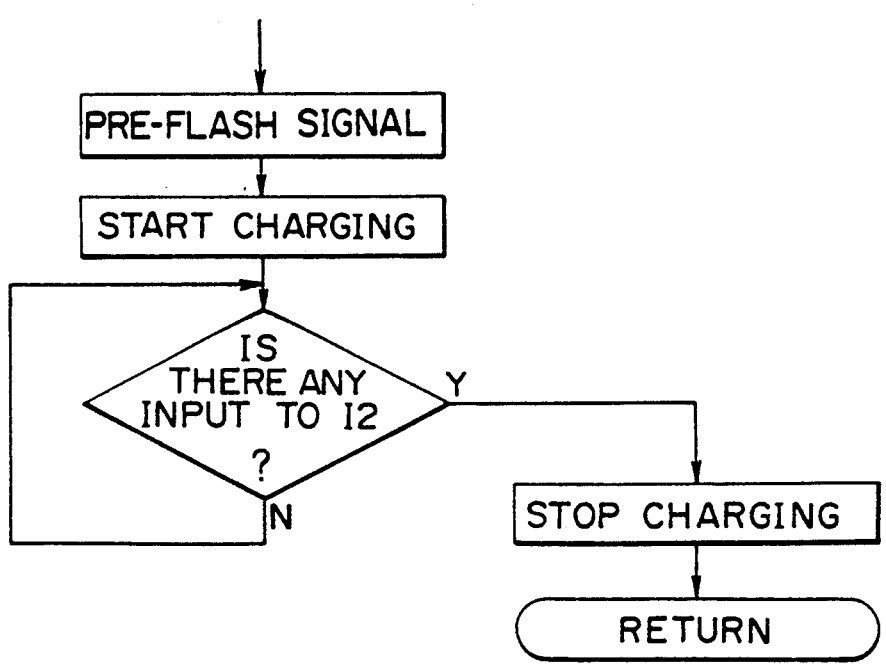
Figure 34:
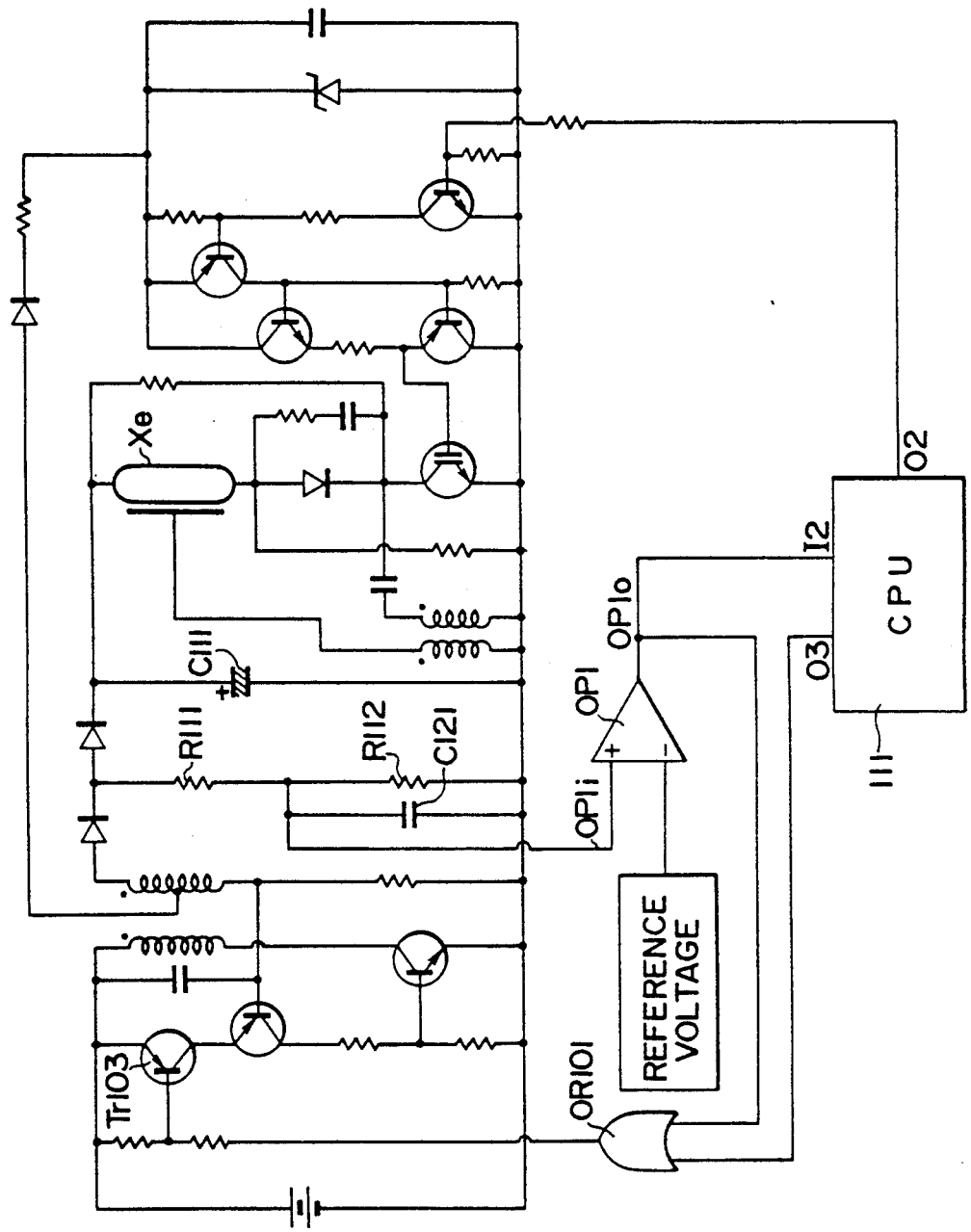
FIG. 34 is a circuit diagram showing a seventh embodiment of the flash device of the present invention.
Figure 35:
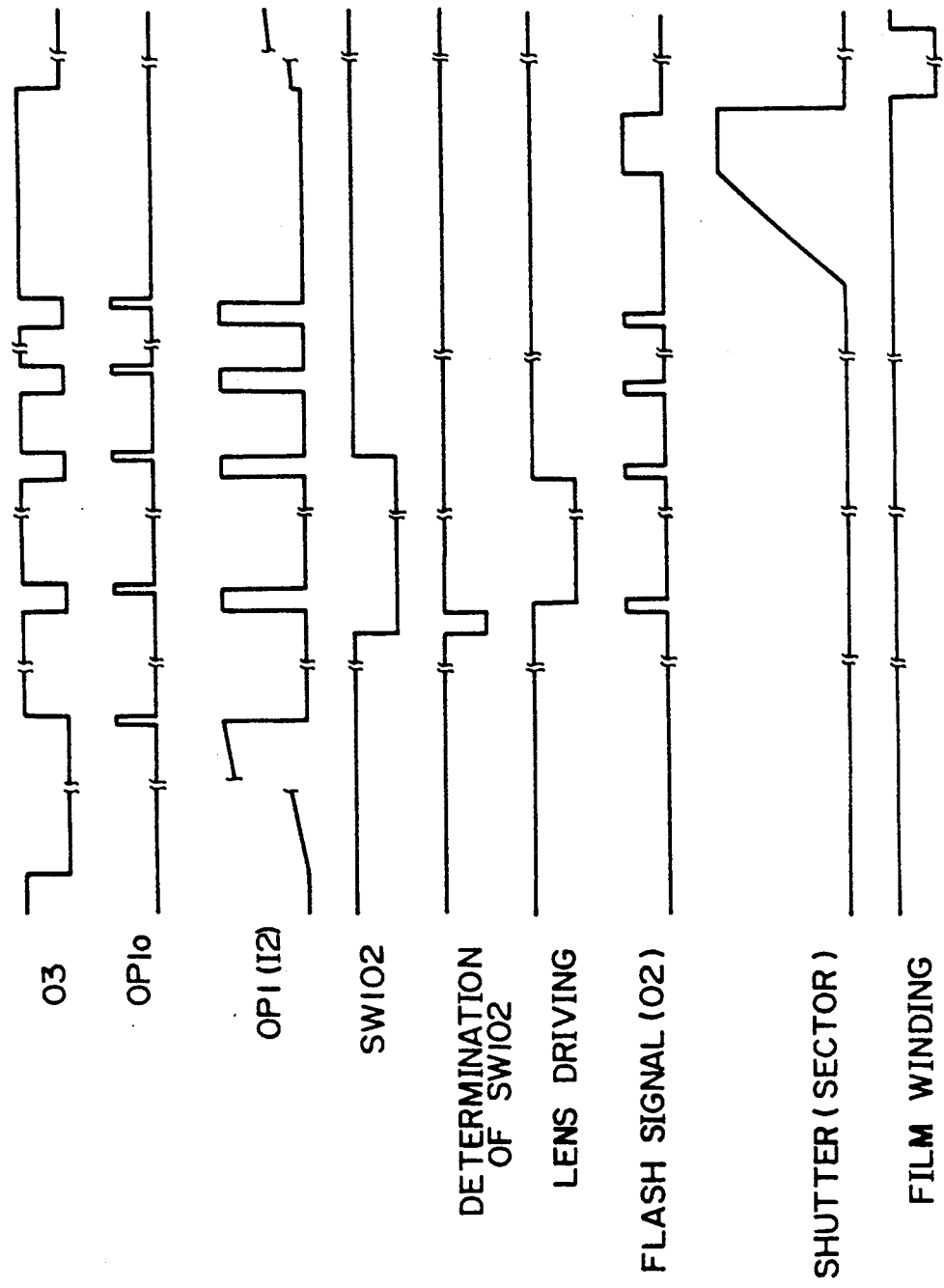
FIG. 35 is a time chart showing the signal relation of the seventh embodiment of the flash device of the present invention.
Figure 36:
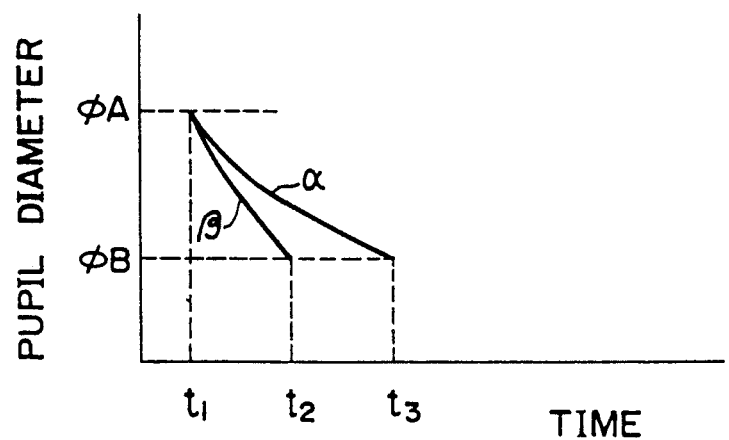
FIG. 36 is a graph showing the relation between the pupil diameter and time.
Figure 37A:
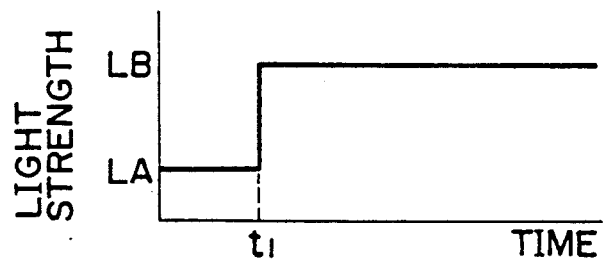
FIGS. 37(A), 37(B) and 37(C) are graphs showing a step change in light strength, the response of the brain perception and the force Fc acting to close the pupil with respect to a step change in light strength, respectively.
Figure 37B:
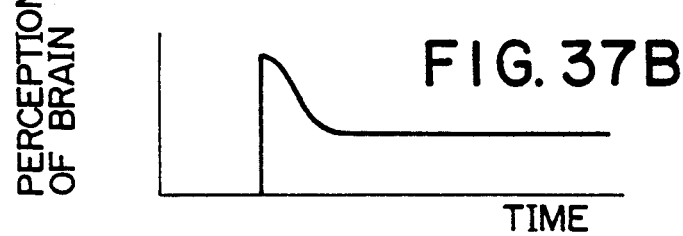
Figure 37C:
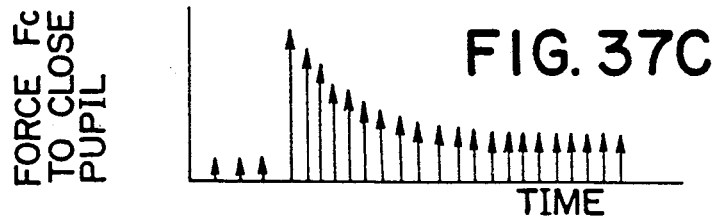
Figure 38A:
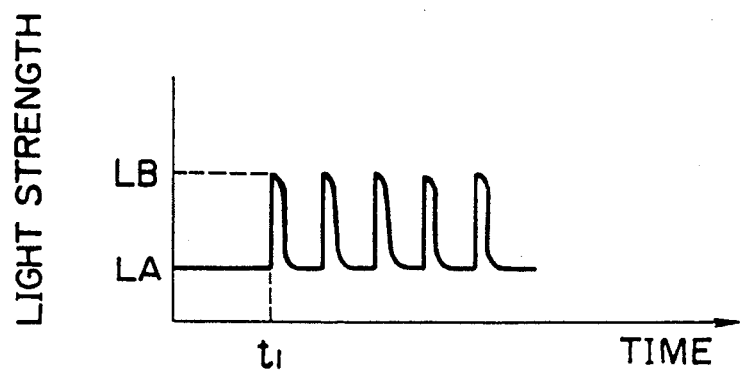
FIGS. 38(A), 38(B), and 38(C) are graphs showing intermittent change in light strength, the response of the brain perception and the force Fc acting to close the pupil with respect to the light strength intermittent change, respectively.
Figure 38B:
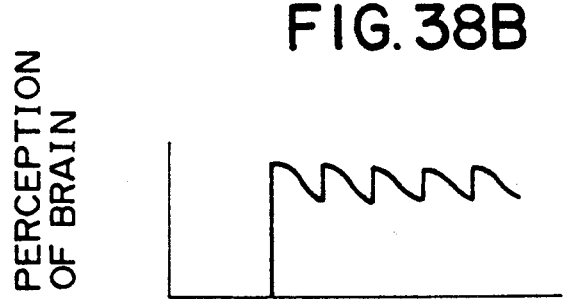
Figure 38C:
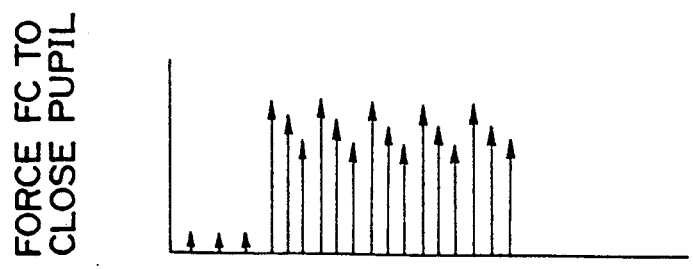

CPU111 should execute various operations and processing after the second depression of the release button. Accordingly, there is likelihood that a period of time for which sequence of charging control can be executed is extended. In this case, a structure shown in FIG. 34 and operation shown in FIGS. 27 and 35 may be incorporated. That is, a comparator OP1 is interposed between the input terminal I2 of the CPU111 and the charging signal output terminal $OP1_i$ of the flash device. The output terminal $OP1_0$ of the comparator OP1 and the output terminal 03 of the CPU111 are connected with a transistor Tr103 for controlling the DC/DC converter of the flash device via an OR circuit OR101. Since the remaining circuit structure of FIG. 34 is identical with that of FIG. 30, a detailed description will be omitted. At an initial phase, the output $OP1_0$ of the comparator OP1 is at a level "L" and the output 03 of the CPU111 is at a level "H". Therefore, the output of OR circuit OR101 is at a level of "H", and the transistor Tr103 is turned off so that the DC/DC converter does not operate. Then, when a power switch (not shown) is turned on, the output terminal 03 of the CPU111 is rendered "L" and the transistor Tr103 is turned on, so that the DC/DC converter operates. When the voltage divided by resistors R111 and R112 reaches a predetermined voltage (reference voltage), the output of the comparator is reversed from "L" to "H". The reversed output is transmitted to the CPU111 and the OR circuit OR101 so that the DC/DC converter is stopped. Thereafter the CPU111 detects the output of OP1 to change the output 03 from "L" to "H". In such a structure, the DC/DC converter can be controlled by the comparator OP1 even when the divided voltage reaches the predetermined voltage. The CPU111 should detect only that the divided voltage reaches a predetermined voltage and change the output of the terminal 03 into an initial value "H", so that the voltage of the main capacitor C111 will not excessively increase. Furthermore CPU111 can freely activate and stop the oscillation of the Dc/Dc converter. The operation at this time is shown in FIG. 27. The above description is summarized in Table 1.

TABLE 1

| O3 | $OP1_0$ | Dc/Dc converter |
|---|---|---|
| L | L | oscillates |
| H | H | stops |
| L | H | stops |
| H | L | stops |

The following distinct effects are obtained in accordance with the present invention. The present invention uses a basic principle that the optic nerve in an eye can cause a pupil to largely respond to serial pulsated light rather than continuous light and generates high brightness serial pulsated light prior to flash synchronized photography.

Therefore, (1) When a main flash is conducted, the pupil size has been reduced. Red-eye phenomenon can be prevented on flash synchoronized picture taking.

(2) Since response of reduction of pupil size is quick, the duration of the serial pulsated light prior to main flash can be shortened. This can shorten the time lag occurred from release, pre-flash and to main flash synchronized picture taking, so that a shutter chance will not be lost.

(3) A flash device can be made compact since pulsated light for reducing the pupil size is generated by the same flash discharge tube which conducts main flash.

(4) Since serial pulsated light for reducing the pupil size has a small light amount, but a high brightness, it positively effects reduction in pupil size without being effected by ambient light.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein described.

What is claimed is:

1. A combination of a picture taking apparatus and a flash device,
    said picture taking apparatus including:
    a first time counting circuit which begins time counting operation in response to a depression output of a shutter release button for providing an output after a first predetermined period of time;
    a second time counting circuit which begins time counting operation in response to an output from the first time counting circuit for providing an output after a second period of time;
    a pulse generator which generates output pulses at intervals of a predetermined period of time in response to the depression output of a release button and stops generating pulses in response to the output from the first time counting circuit; and
    a shutter which opens responsive to the output from the first time counting circuit;
    said flash device including a driving circuit selectively responsive to the pulse outputs and the output from the second time counting circuit for firing a flash tube.

2. A combination of claim 1 in which the first period of time is a period of time which is taken for a pupil of a human being to reduce to a substantially minimum diameter when subject to exposure of intermittent flash.

3. A combination of claim 1 in which the second predetermined period of time is a period of time from the beginning of the opening operation of the shutter to full opening of the shutter.

4. A combination of claim 1 in which the first predetermined period of time is in the range from 0.5 to 1 second.

5. A combination of claim 1 in which the flash device emits light having an amount equivalent to G No. in the range of from 0.6 to 2 in response to the output pulses where G No.=D×f, where D=distance to the subject and f=f−number.

6. A combination of claim 1 in which the pulse generating circuit generates pulses at intervals in the range of 20 ms to 100 ms.

7. A combination of claim 1 in which the pulse generating circuit generates in the range of 5 to 20 pulses until it stops the operation responsive to the output from the first time counting circuit.

8. A combination of claim 1 in which the second time counting circuit provides an output having a pulse width corresponding to a period of time required to cause the flash device to fully emit light.

9. A combination of claim 1 in which the driving circuit includes a trigger circuit which applies a trigger voltage to a flash discharge tube provided in said flash device, an insulated gate bipolar transistor (IGBT) which is series connected with the flash discharge tube; and a circuit which transmits the pulse outputs and the output from the second time counting circuit to the trigger circuit and a control electrode of the IGBT.

10. A combination of a picture taking apparatus and a flash device,
    said picture taking apparatus including:
    a first timer circuit which begins operation in response to depression of a shutter release button for providing an output after a first predetermined period of time;
    a second timer circuit which begins operation in response to an output from the first time counting circuit for providing an output after a second period of time;
    a pulse generator which generates output pulses at intervals of a predetermined period of time in response to the depression of the release button and stops the pulse generation in response to the output from the first timer circuit;
    a second pulse generator which generates pulses in response to the output from the second timer circuit; and
    a shutter which opens responsive to the output from the first time counting circuit;
    said flash device including a flash tube and a driving circuit selectively responsive to the pulse outputs and the output from the second time counting circuit for firing the flash tube.

11. A combination of claim 10 in which the flash device includes means to control the light emission amount depending on the width of the output pulse applied thereto.

12. A combination of claim 10 in which the output pulse from the second pulse generating circuit has a pulse width corresponding to a period of time required to cause the flash device to fully emit light.

13. A combination of claim 10 in which the output pulse from the first pulse generating circuit has a pulse width corresponding to a period of time required to cause the flash device to emit light having a predetermined small amount.

14. A combination of a picture taking apparatus and a flash device,
    said picture taking apparatus including:
    a first time counting circuit which begins a time counting operation in response to depression of a shutter release button for providing an output after a first predetermined period of time;
    a second time counting circuit which begins a time counting operation in response to an output from the first time counting circuit for providing an output after a second period of time;
    a pulse generator which generates output pulses at intervals of a predetermined period of time in response to the depression of the release button and stops the pulse generation in response to the output from the first time counting circuit;
    a shutter which opens responsive to the output from the first time counting circuit;

switching means having a first position to select a mode in which the first time counting circuit is operated in response to the output generated by the depression of the shutter release button and having a second position to select a mode in which the first time counting circuit is rendered inoperative and the second time counting circuit is directly operated in response to the depression of the shutter release button; and said flash device including a flash tube and a circuit for operating said flash tube and being selectively responsive to the pulse outputs and the output from the second time counting circuit for firing said flash tube.

15. A combination of claim 14 in which the switching means includes a manually operated switch.

16. A combination of claim 15 in which the switching means includes means for determining from inputted external data whether or not the first time counting circuit should be switched to operate.

17. A combination of claim 16 in which the external data include at least data on the distance between the picture taking apparatus and an object to be photographed.

18. A combination of claim 16 in which the switching means determining means receives data on the distance l between an object to be photographed and the picture taking apparatus and the spacing d between the optical axis of the taking lens and the center of the flash tube and operates the first time counting circuit in response to the output generated by depression of the shutter release switch when $$\frac{d}{\tan 3°} < l.$$

19. A combination of claim 16 in which the switching means receives data on the distance l between an object to be photographed and a picture taking apparatus, the spacing d between the optical axis of a taking lens and the center of the flash tube and the focal length f of the taking lens and operates the first time counting circuit in response to an output generated by the depression output of a shutter release button when $$\frac{d}{\tan 3°} < l < 70f.$$

20. A photographic picture taking apparatus used with a flash device having a flash tube, comprising:
a first switch which generates a first output in the course of the depression of a shutter release button;
a second switch which generates a second output in a final region of the depression of the shutter release button;
means for outputting data of the spacing between the optical axis of a taking lens and the center of the flash tube;
rangefinding means responsive to the output from the first switch to provide data on the distance between an object to be photographed and the picture taking apparatus; and
operational circuit means for determining the condition whether or not the eyes of the object to be photographed will cause red-eye phenomenon based upon the distance data and the spacing data to select a mode in which main flash for picture taking is conducted when red-eye will not occur and a mode in which pre-flash for reducing the pupil diameter of the object is conducted prior to main flash for taking picture when red-eye will occur, said flash device being adapted to conduct the flash of the mode determined by the operational circuit when it receives the output from the second switch.

21. A camera, comprising:
automatic focus detecting means for computing the distance between an object and the camera;
means for driving a taking lens based upon the output from the automatic focus detecting means;
a flash device;
shutter means which opens or closes after the operation of the driving means has been stopped; and
light emission control means which sequentially applies to the flash device a signal to induce one pre-flash just before the beginning of the operation of the taking lens driving means, signals to induce pre-flash a plurality of times during a period from the stop of the operation of the driving means to the beginning of the opening operation of the shutter and a signal to induce a main flash for picture taking during the opening and closing operation of the shutter.

22. In combination a camera and a flash device, said flash device being responsive to a shutter release signal from said camera which includes means for operating the flash device a plurality of times to reduce the pupil diameter of an object being photographed during a period of time until the opening operation of the shutter and means to operate the flash device to generate a flash for picture taking after the opening operation of the shutter has been started.

23. In combination a camera and a flash device, said camera comprising:
a shutter and means for generating a shutter release signal;
a pre-flash light control circuit responsive to said shutter release signal from the camera for operating the flash device to flash a plurality of times to reduce the pupil diameter of a subject being photographed during a period of time prior to the opening operation of the shutter;
and a main flash control circuit which causes the flash device to conduct a main flash for picture taking after the opening operation of the shutter has been started; and
a switching circuit having a first and a second switch condition for respectively generating an output to select the operation and non-operation of the pre-flash light circuit.

24. A flash device of claim 23 in which said switching circuit includes determining means for generating an output responsive to factors contributing to the occurrence of red-eye phenomenon, applied to said determining means, such as the spacing between a taking lens and a flash discharge tube determined by the geometry of the device, the distance between the camera and the object to be photographed determined by a distance measuring means and the scene brightness determined by a brightness measuring means.

25. A flash picture taking apparatus, comprising:
a first pulse generating means for generating pulse signals at intervals of a predetermined period of time during a period of time from the start of the release operation of a camera just prior to the start of opening operation of the shutter;

a second pulse generating means for generating at least one pulse after the opening operation of the shutter has been started; and a flash device which conducts repeating pre-flashes in response to the pulse signals from the first pulse generating means and conducts a main flash in response to the pulse from the second pulse generating means.

26. A red-eye phenomenon preventive picture taking method comprising the steps of: conducting at least photometric and rangefinding operations in response to a first or half depression of a shutter release member;

conducting pre-flash operation a plurality of times for reducing a pupil size in response to second or full depression of the release member at a second depth;

opening and then closing the shutter immediately after completion of the pre-flash operation; and conducting once a main flash operation for exposure during the shutter opening and closing operation.

27. A camera system, comprising:
a CPU which executes operations necessary for picture taking such as exposure operation, rangefinding operation, control for movement of a taking lens; and a flash device responsive to a shutter release signal for conducting pre-flash a plurality of times for reducing the pupil size of a subject being photographed during a period of time after the reception of the release signal and just before commencement of opening operation of the shutter and for conducting main flash once for exposure after the opening operation of the shutter has been started, and whereby pre-flash for reducing the pupil size is prohibited during the operation of the CPU.

28. A flash device comprising:
a voltage step-up means including a DC/DC converter means for charging a capacitor;

an oscillation control means which stops the oscillation of the step-up means when the capacitor has been charged to a given voltage;

a light emission control means responsive to a plurality of pulses initiated by a camera release signal for conducting pre-flash a plurality of times to reduce the pupil size of a subject being photographed during a period of time after the reception of the release signal and just before the beginning of the opening operation of the shutter and for conducting a main flash for exposure after the start of the opening operation; and driving means for bringing the DC/DC converter means into an inoperative state or an operative state in response to the release signal or flash signal respectively.

29. A flash photographic apparatus, comprising:
switching means having a first state for selecting a red-eye prevention mode in which pre-flash is repeated for preventing red-eye phenomenon before the opening operation of the shutter and a second state for selecting a normal flash mode in which pre-flash is not conducted before the opening operation of the shutter;

means for detecting whether or not the picture taking condition is a red-eye phenomenon occurring condition; and means for displaying a red-eye alarm in response to the output from the red-eye detecting means, whereby display means is operated when the red-eye detecting means provides an output in the normal flash mode.

30. A method for operating a camera and flash device comprising the steps of:
operating the flash device to generate a plurality of short flashes within a predetermined interval;
opening the camera shutter;
operating the flash device to generate a main flash of a time interval greater than each one of said short flashes; and
closing the shutter.

31. The method of claim 30 wherein the number of said short flashes is sufficient to prevent the occurrence of red-eye phenomenon which can result from the photographing of a subject.

32. The method of claim 30 wherein the cumulative amount of light generated by each one of said short flashes is an amount equivalent to GNo in the range of from 0.6 to 2.0 where G No.$=D\times f$, where D=distance to the subject and f=f−number.

33. The method of claim 32 wherein the short flashes are generated within a time interval of from 0.5 to 1.0 seconds.

34. A method for operating a camera and flash device comprising the steps of:
determining whether a subject to be photographed will cause a red-eye phenomenon;
opening the camera shutter;
operating the flash device to generate a main flash;
closing the shutter;
causing the flash device to generate a plurality of short flash bursts prior to opening said shutter in the event that the red-eye phenomenon determining step indicates the possibility of occurrence of the red-eye phenomenon.

35. A method for operating a camera and flash device comprising the steps of:
determining the occurrence of a red-eye phenomenon based upon factors which may include the distance of the subject from the camera, the distance between a taking lens of the camera and the flash device and the brightness of the scene being photographed;
responsive to a determination that a red-eye phenomenon will not occur, performing a first routine including the steps of:
opening the camera shutter;
causing the flash device to generate a main flash sufficient for proper exposure of the scene being photographed; and
closing the shutter upon comopletion of the main flash;
responsive to a determination that a red-eye phenomenon will occur, performing a second routine including the steps of:
causing the flash device to generate a plurality of short flash bursts within a predetermined time interval;
opening the camera shutter;
causing the flash device to generate a main flash sufficient to properly expose the scene being photographed; and
closing the shutter after the main flash has been completed.

36. The method of claim 35 wherein the camera is provided with a mode switch having a normal flash photographing mode position and a red-eye phenomenon prevention mode position and further comprising the steps of:

performing the method steps of the first routine when the switch is in the normal flash photographing mode and when the occurrence a red-eye phenomenon is not indicated; and providing a red-eye alarm when the switch is in the normal flash photographing mode and a red-eye phenomenon is indicated.

37. The method of claim 36 further comprising the steps of:

performing the method steps of the second routine when the mode switch is in the red-eye prevention photographing mode and a red-eye condition is indicated, and performing the method steps of the first routine when the mode switch is in the red-eye prevention photographing mode and it has been determined that a red-eye phenomenon will not occur.

38. A method for operating a camera and flash device for flash photography wherein the camera is provided with CPU for flash photography control, said method comprising the steps of:

operating the CPU to determine the possibility of occurrence of a red-eye phenomenon based upon factors including the distance of the camera from the subject being photographed, the distance between a camera taking lens and the flash device, scene brightness, and the focal length of the taking lens;

controlling the flash device to generate a plurality of short flash pulses when a red-eye condition is present, said pulses being generated within a predetermined time interval;

opening the camera shutter;

causing the flash device to conduct a single main flash;

closing the shutter after the main flash has been completed, wherein the step of operating the flash device to generate short flash bursts is prohibited when the CPU is performing other operations and the short flash pulses are initiated when the CPU has terminated such other functions.

39. A method for operating a flash device including a voltage step-up means and main capacitor for providing energy for a flash tube, said method comprising the steps of:

turning on the step-up means to permit oscillation of the step-up means responsive to the initiation of a photographing request;

examining the voltage charge being developed across the capacitor;

terminating operation of the voltage step-up means when the capacitor has been charged to a given voltage;

operating the flash tube to produce a plurality of short flash bursts for reducing the pupil size of a subject being photographed, said burst pulses time interval being initiated responsive to a camera release signal;

causing the flash device to generate a main flash during a photographing operation; and driving the step-up means to the inoperative state responsive to a shutter release signal or to the operative state responsive to a flash signal.

40. The method of claim 39 wherein the step of examining the voltage charge includes the step of converting the voltage charge to a digital value;

comparing the digital value to a predetermined value; and the terminating step further comprising the step of terminating the operation of the voltage step-up means when the digital value and the predetermined value are substantially the same.

41. A method for operating a camera and flash device comprising the steps of:

initiating a timing interval responsive to a shutter release condition;

causing the flash device to generate a plurality of short flash bursts;

terminating said short flash bursts and opening the camera shutter when the timing interval reaches a predetermined value;

causing the flash device to generate a main flash; and closing the shutter when the main flash has been completed.

42. The method of claim 44 wherein said time interval is no greater than one second.

43. The method of claim 42 wherein the step of generating a flash further includes:

charging first and second capacitors to substantially the same voltage value;

discharging the capacitors through the flash tube provided in the flash device whereby the voltage applied across the flash tube is substantially twice said voltage value.

44. A camera incorporated with a flash device, comprising:

said camera having a shutter release button for initiating picture taking when depressed prior to a shutter opening;

means for generating a plurality of pulse signals followed by a main pulse signal generated during a shutter opening responsive to the depressing of said shutter release button; and a shutter mechanism being opened responsive to said shutter button being depressed and to completion of said plurality of pulse signals;

said flash device having a flash light control circuit which, responsive to said plurality of pulse signals, operates the flash device to flash a plurality of times to reduce the pupil diameter during the period of time just prior to the opening operation of the shutter mechanism is initiated and to flash once for picture taking after opening operation of the shutter has been started.

45. A camera combined with a flash device, said camera comprising:

a shutter and shutter release button for initiating picture taking;

means for generating a pulse signal responsive to the depressing of said shutter release button; and a pre-flash light control circuit which, after receiving said pulse signal, operates the flash device to flash a plurality of times to reduce the pupil diameter during the period of time just prior to the opening operation of the shutter is initiated;

a main flash control circuit which operates the flash device to conduct a main flash for picture taking after the opening operation of the shutter has been started; and a switching circuit for selectively generating either a first or a second output to respectively select the operation and non-operation of said pre-flash light circuit.

* * * * *

UNITED STATES PATENT AND TRADEMARK OFFICE
CERTIFICATE OF CORRECTION

PATENT NO. : 4,999,663
DATED : March 12, 1991
INVENTOR(S) : Hiroaki Nakamura

It is certified that error appears in the above-identified patent and that said Letters Patent is hereby corrected as shown below:

Column 1, line 62, change "it's" to --its--

Column 2, line 13, change "human the being" to --a human being--

Column 4, lines 29 & 30, delete "photographic apparatus which is a combination of the flash"

Column 8, line 37, change "formula" to --formulae--

Column 10, line 36, change "forth" to --fourth--

Column 14, line 45, change "ar" to --are--

Column 16, line 68, change "synchoronized" to --synchronized--

Column 22, line 52, change "comopletion" to --completion--

Signed and Sealed this

Eighteenth Day of May, 1993

Attest:

MICHAEL K. KIRK

Attesting Officer

Acting Commissioner of Patents and Trademarks